(12) United States Patent
Li et al.

(10) Patent No.: US 11,787,904 B2
(45) Date of Patent: Oct. 17, 2023

(54) PHOSPHINATED (2,6-DIMETHYLPHENYL ETHER) OLIGOMER, PREPARATION METHOD THEREOF AND CURED PRODUCT

(71) Applicant: CPC CORPORATION, TAIWAN, Kaohsiung (TW)

(72) Inventors: Sheng-De Li, Chiayi (TW); Ching-Hsuan Lin, Taichung (TW); Cheng-Liang Liu, Taichung (TW); Jun-Cheng Ye, Taichung (TW); You-Lin Shih, Taichung (TW); Yu An Lin, Taichung (TW); Wei-Yen Chen, Chiayi (TW); Way-Chih Hsu, Chiayi (TW); Jui-Fu Kao, Chiayi (TW); Ming-Yu Huang, Chiayi (TW); Jann-Chen Lin, Chiayi (TW); Yih-Ping Wang, Chiayi (TW)

(73) Assignee: CPC CORPORATION, TAIWAN, Kaohsiung (TW)

( * ) Notice: Subject to any disclaimer, the term of this patent is extended or adjusted under 35 U.S.C. 154(b) by 387 days.

(21) Appl. No.: 17/112,757

(22) Filed: Dec. 4, 2020

(65) Prior Publication Data

US 2021/0340321 A1   Nov. 4, 2021

(30) Foreign Application Priority Data

May 4, 2020   (TW) .................. 109114820

(51) Int. Cl.
*C08G 65/48* (2006.01)
*C08F 4/38* (2006.01)
(Continued)

(52) U.S. Cl.
CPC .............. *C08G 65/485* (2013.01); *C08F 4/38* (2013.01); *C08K 5/3415* (2013.01); *C08K 5/3432* (2013.01); *C08K 5/5399* (2013.01)

(58) Field of Classification Search
None
See application file for complete search history.

(56) References Cited

U.S. PATENT DOCUMENTS

| 6,627,704 B2 | 9/2003 | Yeager et al. |
| 6,995,195 B2 | 2/2006 | Ishii et al. |

(Continued)

FOREIGN PATENT DOCUMENTS

| TW | 201502133 A | * | 1/2015 |
| TW | I537281 B | | 6/2016 |

OTHER PUBLICATIONS

Lin, C.H. et al., "Novel phosphorus-containing epoxy resins Part I. Synthesis and properties", Polymer, vol. 42, Issue 5, Mar. 2001, pp. 1869-1878.

(Continued)

*Primary Examiner* — Tae H Yoon
(74) *Attorney, Agent, or Firm* — Muncy, Geissler, Olds & Lowe, P.C.

(57) ABSTRACT

A phosphinated (2,6-dimethylphenyl ether) oligomer, preparation method thereof and cured product. The phosphinated (2,6-dimethylphenyl ether) oligomer includes a structure represented by Formula (1):

Formula (1)

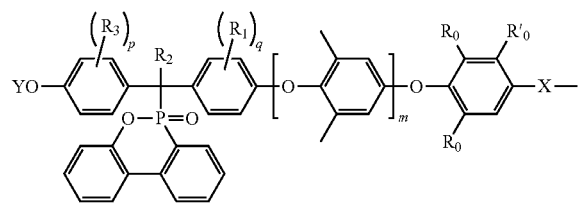

(Continued)

Chemical Shift (ppm)

-continued

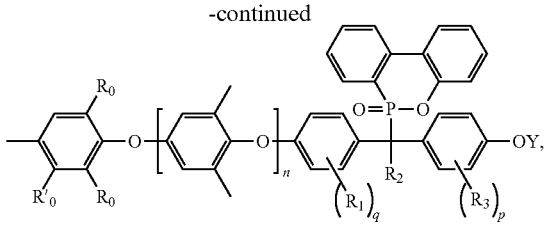

wherein X is a single bond, —CH$_2$—, —O—, —C(CH$_3$)$_2$— or

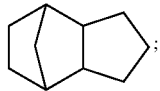

R'$_0$, R$_0$, R$_1$, R$_2$ and R$_3$ are independently hydrogen, C1-C6 alkyl or phenyl; n and m are independently an integer from 0 to 300; p and q are independently an integer from 1 to 4; Y is hydrogen,

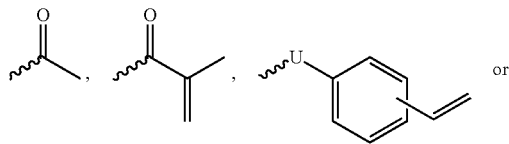 or -continued

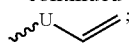

;

U and V are independently an aliphatic structure.

15 Claims, 6 Drawing Sheets

(51) Int. Cl.
    *C08K 5/3415*     (2006.01)
    *C08K 5/3432*     (2006.01)
    *C08K 5/5399*     (2006.01)

(56)     References Cited

U.S. PATENT DOCUMENTS

| | | | |
|---|---|---|---|
| 8,822,723 B2* | 9/2014 | Su | C07F 9/6571<br>72<br>568/12 |
| 2013/0012668 A1* | 1/2013 | Lin | C08G 59/621<br>549/219 |
| 2017/0088669 A1 | 3/2017 | Hsieh et al. | |

OTHER PUBLICATIONS

Hwang, Hann-Jang, et al., "Synthesis and properties of bismaleimide resin containing dicyclopentadiene or dipentene. VI", Polymer Internatonal, vol. 55, Issue 11, Nov. 2006, pp. 1341-1349.

Hwang, Hann-Jang, et al., "Flame Retardancy and Dielectric Properties of Dicyclopentadiene-Based Benzoxazine Cured with a Phosphorus-Containing Phenolic Resin", Journal of Applied Polymer Science, Nov. 15, 2008, vol. 110, Issue 4, pp. 2413-2423.

* cited by examiner

PHOSPHINATED (2,6-DIMETHYLPHENYL ETHER) OLIGOMER, PREPARATION METHOD THEREOF AND CURED PRODUCT

This application claims priority of Application No. 109114820 filed in Taiwan on 4 May 2020 under 35 U.S.C. § 119; the entire contents of all of which are hereby incorporated by reference.

BACKGROUND OF THE INVENTION

Field of the Invention

The present invention relates to an oligomer, preparation method thereof and cured product, and particularly relates to a phosphorus-containing (2,6-dimethylphenyl ether) oligomer, preparation method thereof and cured product.

Description of the Prior Art

Poly (2,6-dimethylphenyl ether) (poly (2,6-dimethyl-1,4-phenylene oxide, PPO), one of the five major engineering plastics, is an amorphous thermoplastic polymer, which has high molecular weight and rigid structure, with the characteristics of high glass transition temperature (Tg), impact resistance, and low expansion coefficient, more particularly, it has excellent electrical properties because it does not have hydrolyzable bonds and polar functional groups. However, the high molecular weight of poly (2,6-dimethylphenyl ether) results in its high viscosity and poor solubility, which limits the application range of it.

The US patent [1] discloses the modification of a high molecular weight poly (2,6-dimethylphenyl ether) into a (2,6-dimethylphenyl ether) oligomer, also known as a polyphenylene ether oligomer (oligo phenylene ether, OPE). Low-molecular-weight poly (2,6-dimethylphenyl ether) (poly (2,6-dimethyl-1,4-phenylene oxide), PPO) is one of the most widely used materials for high-frequency communication substrates today, because of the low-molecular-weight poly (2,6-dimethylphenyl ether) with excellent organic solubility, processability, thermal stability and other advantages. Therefore, many patents are directed towards the modification of low-molecular-weight poly (2,6-dimethylphenyl ether). However, the (2,6-dimethylphenyl ether) oligomer needs to be modified to form a cross-linkable terminal group structure due to its poor heat resistance, such as a commercially available product SA9000 (SABIC corporation company) with an acrylic terminal group.

The US patent [2] also improved the poly (2,6-dimethylphenyl ether) and modified its terminal functional group, such as a commercially available product OPE-2St (MGC company) with a vinyl benzyl ether terminal group.

The structures of commercially available products SA9000 and OPE-2St are as follows:

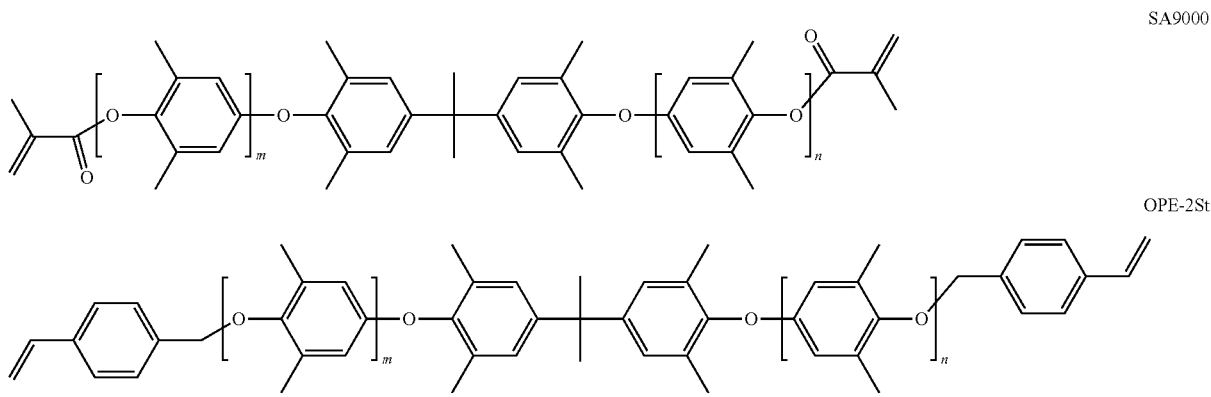

SA9000

OPE-2St

Dicyclopentadiene (DCPD) is one of the C$_5$ by-products of petroleum pyrolysis. Due to its high boiling point, easy separation, and rigid aliphatic bicyclic ring structure, its derivatives have excellent thermal and dielectric properties. In the reference [3], a bismaleimide containing dicyclopentadiene (DCPD) and dipentene was synthesized, which had lower dielectric constant compared with an aromatic bismaleimide after curing, showing that introducing a non-polar aliphatic structure into the structure could effectively reduce the dielectric constant of the material. In reference [4], an oxonitrobenzocyclohexane resin containing a dicyclopentadiene (DCPD) structure was synthesized, the cured product of which had lower dielectric constant compared with an oxonitrobenzocyclohexane resin with a bisphenol A structure as basebone. Therefore, development of poly (2,6-dimethylphenyl ether) containing a dicyclopentadiene (DCPD) structure could obtain a low dielectric constant substrate of circuit board.

On the other hand, poly (2,6-dimethylphenyl ether) has flame retardant property only reaching Grade V-1 according to the test of flame retardant measurement (UL-94 flame retardant test). Further progress to Grade V-0 requires addition of an extra flame retardant such as halogen or phosphinated flame retardant. Among them, halogen flame retardant released toxic substances when burned, and therefore the phosphinated flame retardant has been most commonly used in recent years. It is well known that the phosphinated flame retardant will form polyphosphoric acid when burned, which promotes the carbonization of the material and forms a dense coke layer to isolate oxygen, and it is easy to capture active free radicals in the gas phase, reducing free radical propagation reactions, and achieving flame retardant effect.

Wang and Lin scholars has published in 2001 [5] an open-loop addition reaction by using 9,10-dihydro-9-oxa-10-phosphaphenanthrene-10-oxide (DOPO) with a commercially available epoxy resin to obtain epoxy resins with different phosphorus content, followed by copolymerization and curing with the commercially available hardeners DDS, PN and DICY. Based on the thermal properties test results, the introduction of phosphorus into the structure could greatly increase the coke residual percentage, and in the flame retardant measurement (UL-94 flame retardant test), the cured product with a phosphorus content of more than 1.45% by weight could reach Grade V-0, demonstrating that phosphorus-based components play an important role in the flame retardant property of materials. Therefore, it is necessary to develop a phosphinated (2,6-dimethylphenyl ether) oligomer.

Taiwan Patent [6] discloses a phosphinated poly (2,6-dimethylphenyl ether) oligomer, having a structure as follows:

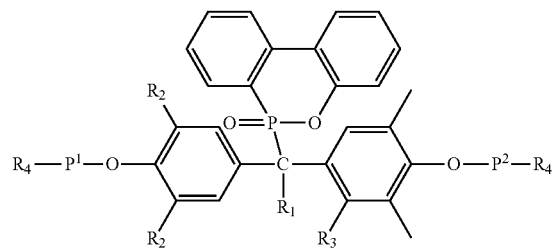

wherein $P^1$ is absent or represents

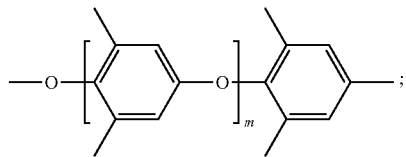

$P^2$ represents

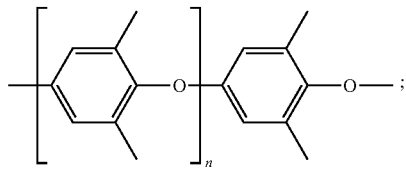

$R_1$, $R_2$, $R_3$ each independently represent hydrogen or a linear or branched alkyl group having 1 to 6 carbons, preferably hydrogen, methyl or ethyl; $R_4$ represents hydrogen or an alkenyl or aryl group with 1 to 10 carbons and 0 to 3 oxygens, or a combination thereof, preferably

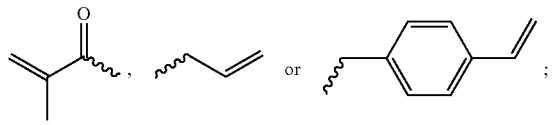

n and m are independently an integer from 0 to 30, preferably an integer from 0 to 20. However, there is only one phosphorus element in the above structure, which limits its flame retardant property.

US patent [7] proposed a method for introducing the phosphorus structure into the terminal groups of the (2,6-dimethylphenyl ether) oligomers, including: firstly the phenolic end (2,6-dimethyl phenyl ether) oligomer (commercially available product SA90) is reacted with dichloro-p-xylene to form (2,6-dimethyl phenyl ether) oligomer with CH$_2$Cl as terminal groups, followed by reacting with a phosphorus-containing diphenol compound to form the (2,6-dimethylphenyl ether) oligomers with phosphated phenolic terminal groups, which were then modified to form the resin with vinyl benzyl ether as terminal groups, and the structure was as follows:

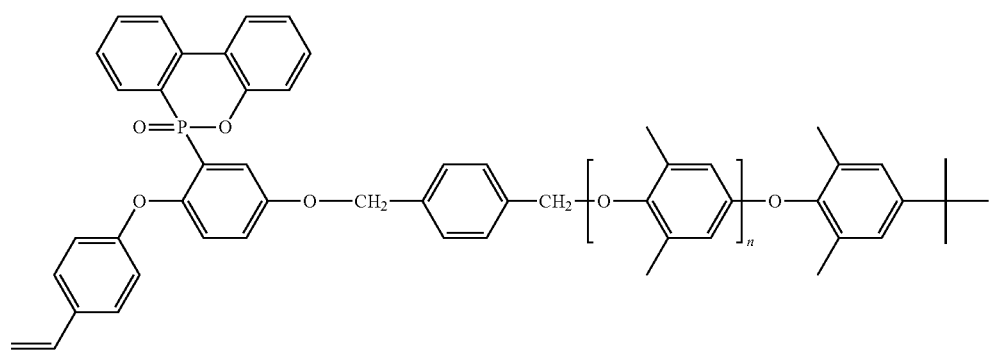

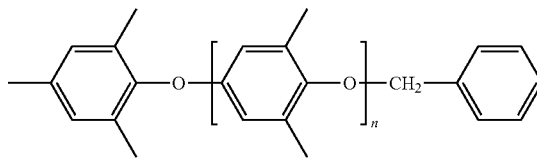
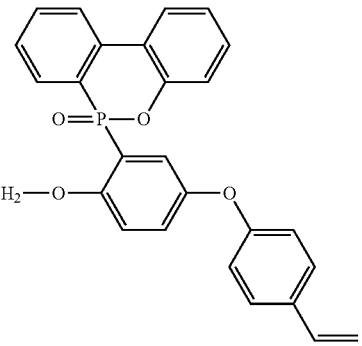

However, most of the phosphorus-containing (2,6-dimethylphenyl ether) oligomers mentioned in the aforementioned patents or references have complicated synthesis reaction steps. Taking the resin synthesized in the above US patent [7] as an example, it was required more than three steps, with an extra two steps for the synthesis of phosphinated bisphenol, for a total of at least five steps. Furthermore, most of the phosphorus containing (2,6-dimethyl phenyl ether) oligomers mentioned above are bilateral reactive monomers, because the synthesis process must use only one-sided intermediates. The by-products of the bilateral reaction must be separated by separation and purification procedures. Therefore, the development of a phosphorus-containing (2,6-dimethylphenyl ether) oligomer with excellent performance, wide application and simpler preparation method is the goal of the industry's joint efforts.

REFERENCES

[1] U.S. Pat. No. 6,627,704 B2
[2] U.S. Pat. No. 6,995,195 B2
[3] Polym. Int. 2006, 55 (11), 1341-1349.
[4] Journal of Applied Polymer Science. 2008, 110 (4), 2413-2423.
[5] *Polymer* 2001, 42(5), 1869
[6] TW I537281B
[7] US 2017/0088669 A1

SUMMARY OF THE INVENTION

The present invention provides a phosphinated (2,6-dimethylphenyl ether) oligomer, preparation method thereof and cured product, with high glass transition temperature, low dielectric property, better thermal stability and good flame retardant property.

The phosphinated (2,6-dimethylphenyl ether) oligomer of the present invention, having a structure represented by Formula (1):

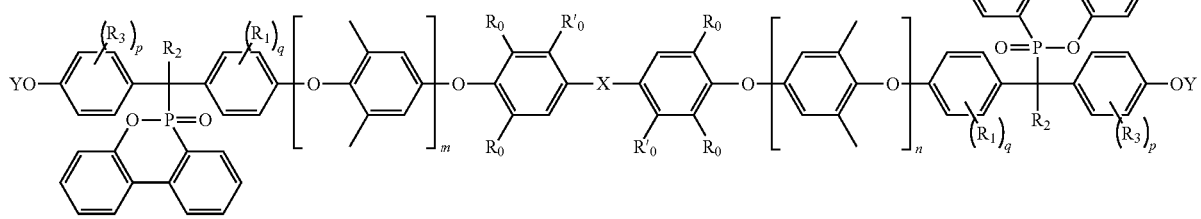

Formula (1)

Wherein X is a single bond, —$CH_2$—, —O—, —$C(CH_3)_2$— or

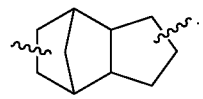

$R'_0$, $R_0$, $R_1$, $R_2$ and $R_3$ are independently hydrogen, C1-C6 alkyl or phenyl. n and m are independently an integer from 0 to 300. p and q are independently an integer from 1 to 4. Y is hydrogen,

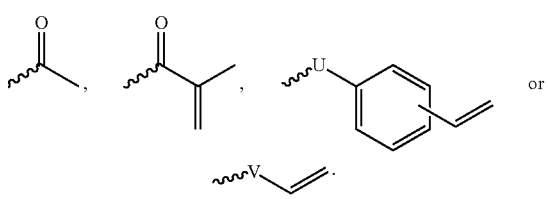

U and V are independently an aliphatic structure.

The preparation method for the phosphinated (2,6-dimethylphenyl ether) oligomer of the present invention comprises the following steps. Firstly, a phenolic terminal (2,6-dimethylphenyl ether) oligomer represented by Formula (2) is reacted with a phenone compound or a benzaldehyde compound represented by Formula (3) under the catalysis of an alkaline catalyst to obtain a bifunctional (2,6-dimethylphenyl ether) oligomer represented by Formula (4). Secondly, the bifunctional (2,6-dimethylphenyl ether) oligomer, 9,10-dihydro-9-oxa-10-phosphaphenanthrene-10-oxide and phenol containing $R_3$ represented by Formula (5) are reacted under the catalysis of an acid catalyst to obtain a phosphorus-containing bisphenol (2,6-dimethylphenyl ether) oligomer represented by Formula (6). Finally, the phosphinated bisphenol (2,6-dimethylphenyl ether) oligomer is reacted with acetic anhydride or methyl acrylic anhydride under the catalysis of a nitrogen-containing or alkaline catalyst, or reacting the phosphinated bisphenol (2,6-dimethylphenyl ether) oligomer with 3-vinylbenzyl chloride, 4-vinylbenzyl chloride or a combination thereof under the catalysis of the alkaline catalyst.

Formula (2)
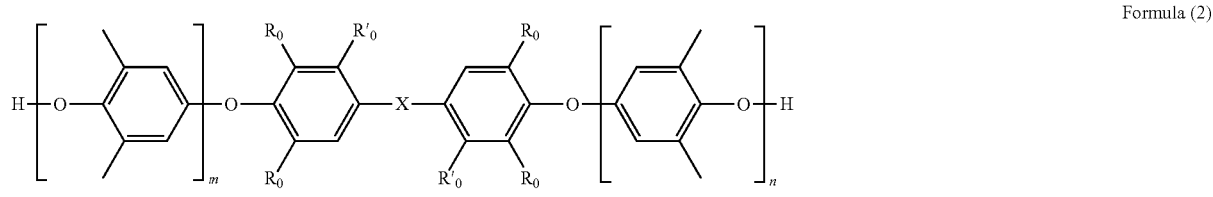

Formula (3)

Formula (4)
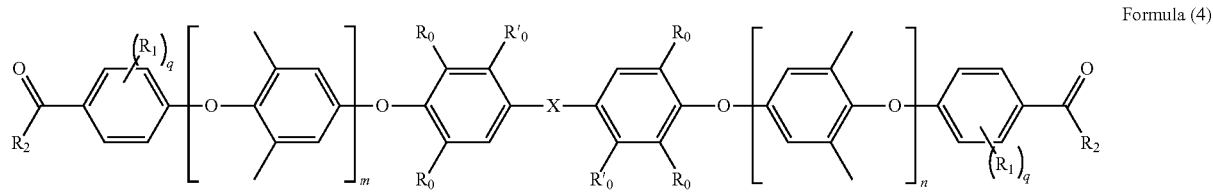

Formula (5)

Formula (6)

wherein X is a single bond, —$CH_2$—, —O—, —$C(CH_3)_2$— or

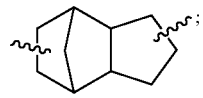

R'$_0$, R$_0$, R$_1$, R$_2$ and R$_3$ are independently hydrogen, C1-C6 alkyl or phenyl. Z is fluorine or chlorine. n and m are independently an integer from 0 to 300. p and q are independently an integer from 1 to 4. In one embodiment of the present invention, the above-mentioned alkaline catalyst comprises potassium carbonate, sodium carbonate, potassium hydroxide, sodium hydroxide, sodium bicarbonate, sodium acetate, or a combination thereof.

In one embodiment of the present invention, the above-mentioned acid catalyst comprises hydrochloric acid, hydrobromic acid, hydroiodic acid, sulfuric acid, methanesulfonic acid, methylbenzenesulfonic acid, or a combination thereof.

In one embodiment of the present invention, the above-mentioned nitrogen-containing catalyst comprises 4-dimethylaminopyridine, pyridine, imidazole, dimethylimidazole, or a combination thereof.

The cured products of the present invention are obtained by mixing the above-mentioned phosphinated (2,6-dimethylphenyl ether) oligomer with a catalyst and heating and curing.

In one embodiment of the present invention, the above-mentioned catalyst comprises benzoyl peroxide, tert-butyl cumene peroxide, or a combination thereof.

In one embodiment of the present invention, the content of the catalyst is 0.1% to 1.0% by weight based on the total weight of the phosphinated (2,6-dimethylphenyl ether) oligomer.

The cured products of the present invention are obtained by mixing the above-mentioned phosphinated (2,6-dimethylphenyl ether) oligomer and epoxy resin in equivalent amounts, followed by copolymerizing with a catalyst by heating. The catalyst comprises an epoxy resin ring open agent and a double bond initiator.

In one embodiment of the present invention, the above-mentioned epoxy resin ring open agent comprises 4-dimethylaminopyridine, pyridine, imidazole, dimethylimidazole, or a combination thereof.

In one embodiment of the present invention, the content of the epoxy resin ring open agent is 0.5% to 2.0% by weight based on the total weight of the epoxy resin.

In one embodiment of the present invention, the above-mentioned double bond initiator comprises benzoyl peroxide, tert-butyl cumene peroxide, di-tert-butyl peroxide, or a combination thereof.

In one embodiment of the present invention, the content of the double bond initiator is 0.1% to 1.0% by weight based on the total weight of the phosphorus-containing (2,6-dimethylphenyl ether) oligomer.

A use of the phosphorus-containing (2,6-dimethylphenyl ether) oligomer of the present invention is a material for making a base board, a copper clad laminate or a printed circuit board.

In addition, the phosphinated (2,6-dimethylphenyl ether) oligomers in this embodiments have excellent organic solubilities due to their low molecular weight. Moreover, the cured products prepared from the phosphinated (2,6-dimethylphenyl ether) oligomers in this embodiments can have high glass transition temperature, low dielectric properties, better thermal stability and good flame retardant properties.

In order to make the above-mentioned features and advantages of the present invention more comprehensible, the following specific embodiments are described in detail in conjunction with the accompanying drawings.

DESCRIPTION OF THE PREFERRED EMBODIMENTS

Figure 1:
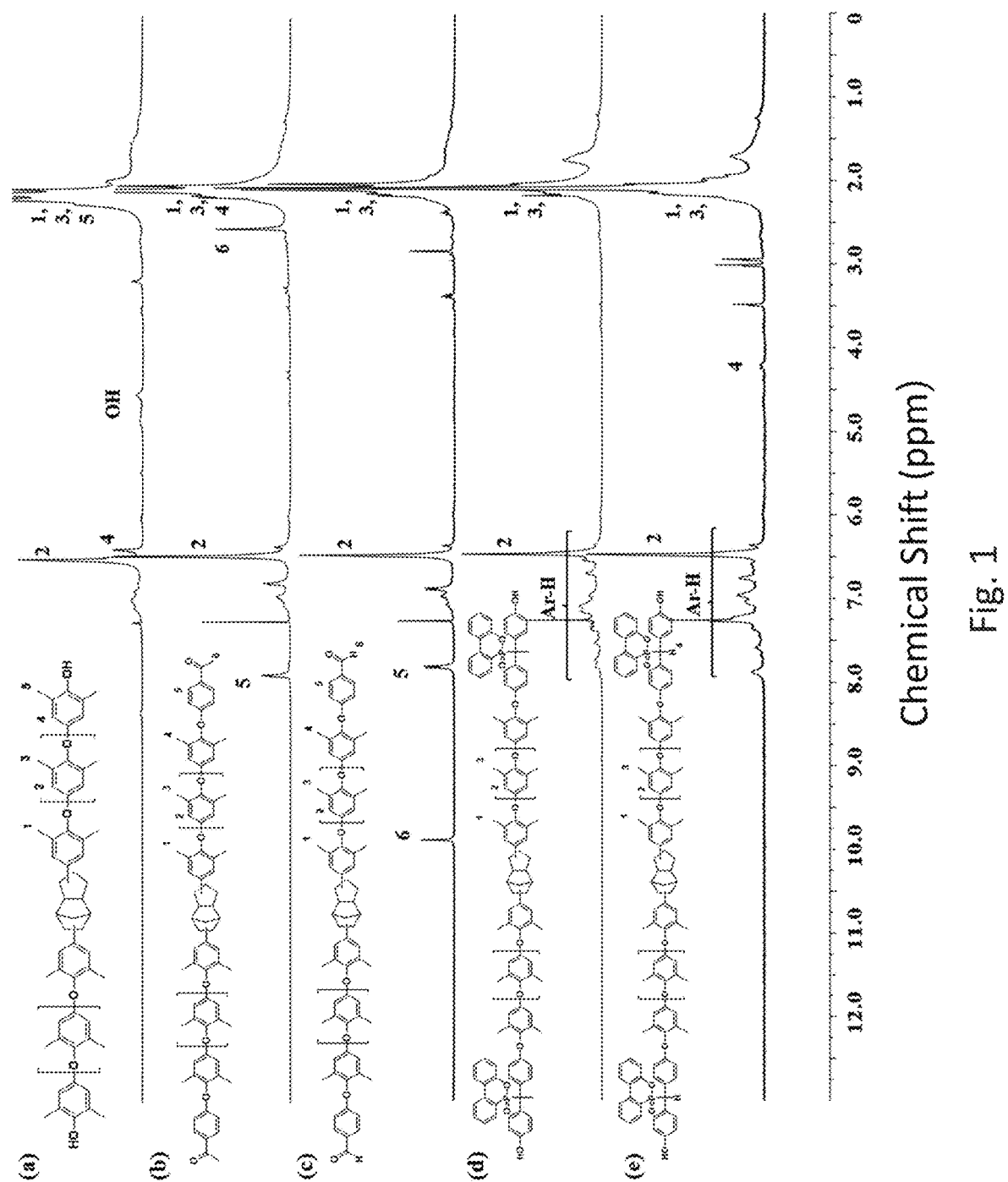
FIGS. 1 to 6 are NMR spectrograms of the compounds synthesized in Embodiment 1 to Embodiment 7 of the present invention.

Hereinafter, the present invention will be further described through the embodiments shown as below, but these embodiments are only for illustrative purposes and do not limit the scope of the present invention.

[Phosphinated (2,6-Dimethylphenyl Ether) Oligomer]

The phosphinated (2,6-dimethylphenyl ether) oligomer in this embodiment, having a structure represented by Formula (1):

Formula (1)

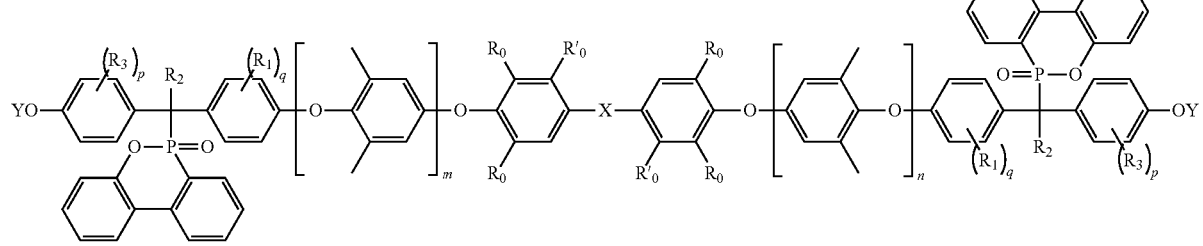

wherein X is a single bond, —CH$_2$—, —O—, —C(CH$_3$)$_2$— or

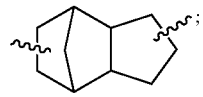

R'$_0$, R$_0$, R$_1$, R$_2$ and R$_3$ are independently hydrogen, C1-C6 alkyl or phenyl group. n and m are independently an integer from 0 to 300. p and q are independently an integer from 1 to 4. Y is hydrogen,

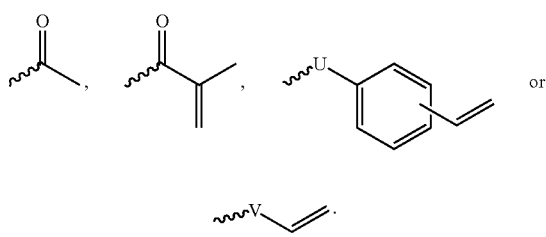

U and V are independently an aliphatic structure.

[Preparation Method for the Phosphinated (2,6-Dimethylphenyl Ether) Oligomer]

The preparation method for the phosphinated (2,6-dimethylphenyl ether) oligomer in this embodiment comprises the following steps.

Firstly, proceed to step 1, reacting a phenolic terminal (2,6-dimethylphenyl ether) oligomer represented by Formula (2) with a phenone compound or a benzaldehyde compound represented by Formula (3) under the catalysis of an alkaline catalyst, is carried out to obtain a bifunctional (2,6-dimethylphenyl ether) oligomer represented by Formula (4).

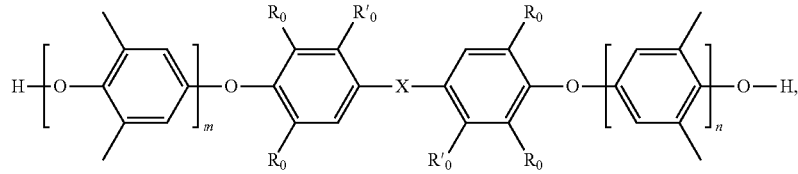

Formula (2)

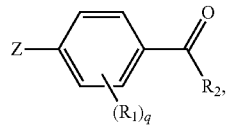

Formula (3)

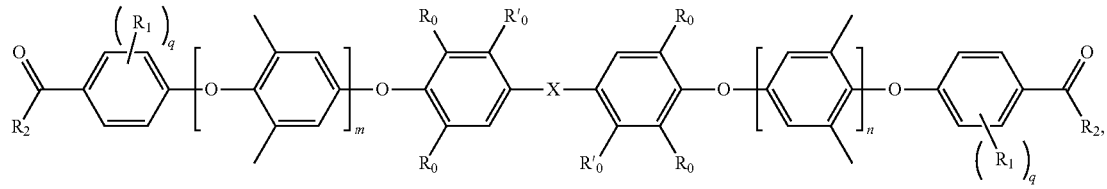

Formula (4)

wherein X is a single bond, —$CH_2$—, —O—, —$C(CH_3)_2$— or

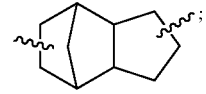

$R'_0$, $R_0$, $R_1$ and $R_2$ are independently hydrogen, C1-C6 alkyl or phenyl group, Z is fluorine or chlorine, n and m are independently an integer from 0 to 300. q is an integer from 1 to 4.

In one embodiment, the alkaline catalyst is, for example, potassium carbonate, sodium carbonate, potassium hydroxide, sodium hydroxide, sodium bicarbonate, sodium acetate, or a combination thereof.

In one embodiment, the phenolic terminal (2,6-dimethylphenyl ether) oligomer represented by Formula (2) is synthesized by the oxidative coupling polymerization of bisphenol and 2,6-dimethylphenol in Embodiment 1.

In one embodiment, the phenone compound or benzaldehyde compound represented by Formula (3) is, for example, 4-fluoroacetophenone, 4-chloroacetophenone, 4-fluorobenzaldehyde, 4-chlorobenzaldehyde, etc.

In one embodiment, the bifunctional (2,6-dimethylphenyl ether) oligomer represented by Formula (4) is, for example, the (2,6-dimethylphenyl ether) oligomer containing a diketone structure or the (2,6-dimethylphenyl ether) oligomer containing a dialdehyde structure, where the (2,6-dimethylphenyl ether) oligomer containing the diketone structure is, for example, a compound when $R_2$ in the Formula (4) is a methyl group, and the (2,6-dimethylphenyl ether) oligomer containing the dialdehyde structure is a compound when $R_2$ in the Formula (4) is hydrogen. Secondly, proceed to step 2, the bifunctional (2,6-dimethylphenyl ether) oligomer, 9,10-dihydro-9-oxa-10-phosphaphenanthrene-10-oxide and the $R_3$-containing phenol represented by Formula (5) are reacted under the catalysis of an acid catalyst to obtain a phosphinated bisphenol (2,6-dimethylphenyl ether) oligomer represented by Formula (6).

Formula (5)

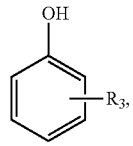

Formula (6)

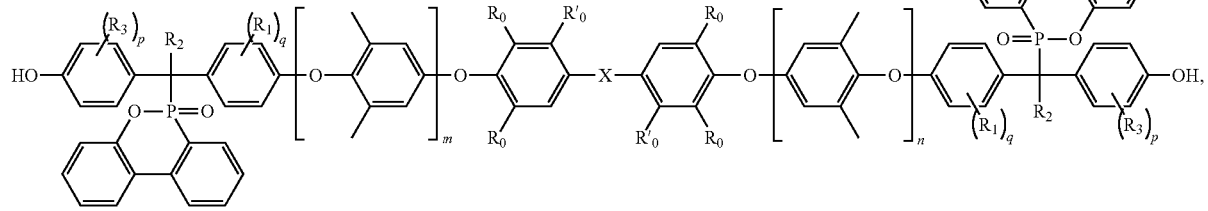

wherein X is a single bond, —$CH_2$—, —O—, —$C(CH_3)_2$— or

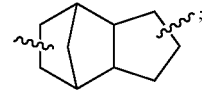

$R'_0$, $R_0$, $R_1$, $R_2$, $R_3$, n, m, p and q are defined as above and will not be repeated here.

In one embodiment, the acid catalyst is, for example, hydrochloric acid, hydrobromic acid, hydroiodic acid, sulfuric acid, methanesulfonic acid, methylbenzenesulfonic acid, or a combination thereof.

In one embodiment, the $R_3$-containing phenol represented by Formula (5) is, for example, phenol. Finally, proceed to step 3, the phosphinated bisphenol (2,6-dimethylphenyl ether) oligomer is reacted with acetic anhydride or methyl acrylic anhydride under the catalysis of a nitrogen-containing or alkaline catalyst, or the phosphinated bisphenol (2,6-dimethylphenyl ether) oligomer is reacted with 3-vinylbenzyl chloride, 4-vinylbenzyl chloride or a combination thereof under the catalysis of the alkaline catalyst to obtain the phosphinated (2,6-dimethylphenyl ether) oligomer represented by Formula (1).

Formula (1)

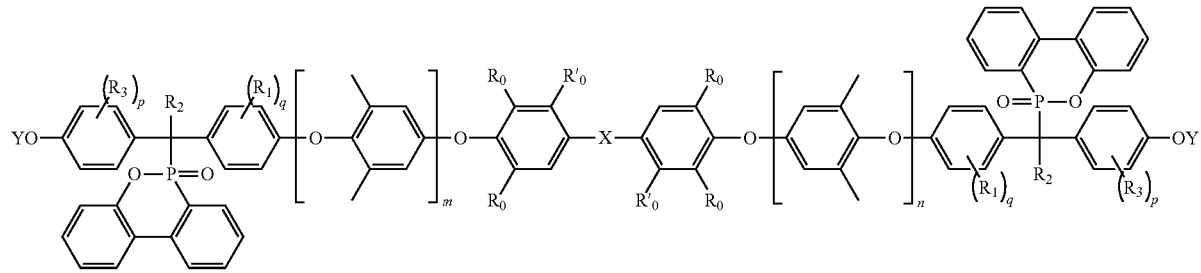

wherein X is a single bond, —$CH_2$—, —O—, —$C(CH_3)_2$— or

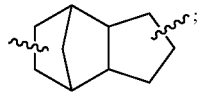

$R'_0$, $R_0$, $R_1$, $R_2$ and $R_3$ are independently hydrogen, C1-C6 alkyl or phenyl. n and m are independently an integer from 0 to 300. p and q are independently an integer from 1 to 4. Y is hydrogen,

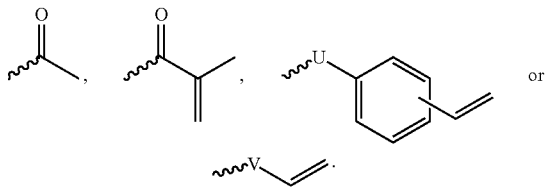

U and V are independently an aliphatic structure.

In one embodiment, the nitrogen-containing catalyst is, for example, 4-dimethylaminopyridine, pyridine, imidazole, dimethylimidazole, or a combination thereof.

[Cured Product]

The cured products in this embodiment, which are obtained by mixing the above-mentioned phosphinated (2,6-dimethylphenyl ether) oligomer represented by Formula (1) with a catalyst by heating and curing.

In one embodiment, the catalyst is, for example, benzoyl peroxide, tert-butyl cumene peroxide, or a combination thereof.

In one embodiment, the content of the catalyst is, for example, 0.1% to 1.0% by weight based on the total weight of the phosphinated (2,6-dimethylphenyl ether) oligomer.

The cured products in another embodiments are obtained by mixing the phosphinated (2,6-dimethylphenyl ether) oligomer represented by Formula (1) with an epoxy resin in equivalent amounts, followed by copolymerizing with a catalyst by heating. The catalyst is, for example, an epoxy resin ring open agent and a double bond initiator.

In one embodiment, the epoxy resin ring open agent is, for example, 4-dimethylaminopyridine, pyridine, imidazole, dimethylimidazole, or a combination thereof.

In one embodiment, the content of the epoxy resin ring open agent is, for example, 0.5% to 2.0% by weight based on the total weight of the epoxy resin.

In one embodiment, the double bond initiator is, for example, benzoyl peroxide, tert-butyl cumene peroxide, di-tert-butyl peroxide, or a combination thereof.

In one embodiment, the content of the double bond initiator is, for example, 0.1% to 1.0% by weight based on the total weight of the phosphinated (2,6-dimethylphenyl ether) oligomer.

[Applications of Phosphinated (2,6-Dimethylphenyl Ether) Oligomer]

The applications of the phosphinated (2,6-dimethylphenyl ether) oligomer in this embodiment are, for example, a material for making a base board, a copper clad laminate or a printed circuit board. Hereinafter, the present invention will be described in more detail below with reference to experimental examples. Although the following experiments are described, without going beyond the scope of the present invention, the materials used, their amounts and ratios, processing details, processing procedures, etc. can be appropriately changed. Therefore, the present invention should not be interpreted restrictively based on the experiments described below.

[Preparation for the Bifunctional (2,6-Dimethylphenyl Ether) Oligomer]

The bifunctional (2,6-dimethylphenyl ether) oligomer of the present invention can be formed, for example, by the reaction steps shown below, which are only an example, but the present invention is not limited thereto. The phenolic terminal (2,6-dimethylphenyl ether) oligomer represented by preceding Formula (2) is reacted with 4-fluoroacetophenone, 4-chloroacetophenone, 4-fluorobenzaldehyde or 4-chlorobenzaldehyde the like under the catalysis of an alkaline catalyst to obtain a (2,6-dimethylphenyl ether) oligomer containing a diketone structure or a (2,6-dimethylphenyl ether) oligomer containing a dialdehyde structure.

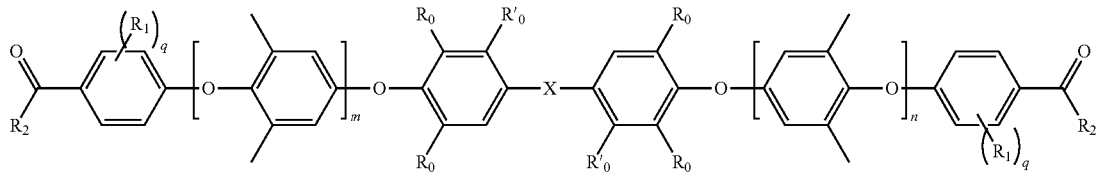

wherein X is a single bond, —$CH_2$—, —O—, —$C(CH_3)_2$— or

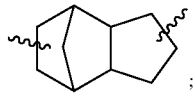

$R_2$ is hydrogen, C1-C6 alkyl or phenyl group, n and m are independently an integer from 0 to 300, Z is fluorine or chlorine.

[Embodiment 1] Synthesis of Phenolic Terminal (2,6-Dimethylphenyl Ether) Oligomer (Oligomer A) Containing the Adduct Structure of "Dicyclopentadiene and 2,6-Dimethylphenol"

0.18 g (1.818 mmole) of cuprous chloride (CuCl), 1.2 g (1.818*5.5 mmole) of DMAP, 18.6 ml of methanol, and 1.5 ml of water were taken in a 250 ml three-necked flask and stirred, and oxygen was blowed under the liquid surface and stirred continuously for 15 minutes. In addition, 2.31 g (6.141 mmole) of DCPD-2,6-DP and 3.00 g (6.141*4 mmole) of 2,6-dimethylphenol were pre-dissolved in 30 ml of methanol, and then poured into the above-mentioned chlorinated cuprous (CuCl) solution, bubbling in oxygen to react for 4 hours. After the reaction, the filter cake was collected by filtration, and the filter cake was washed once with 500 ml of methanol and 1 ml of hydrochloric acid aqueous solution, followed by being washed with 500 ml of methanol for several times, and then dried to obtain a light brown powder with a yield of 80%, as shown in the figure below. Wherein, n and m are each independently an integer from 0 to 300. The $^1$H-NMR spectrum of the sample refers to FIG. 1(a).

Next, the $^1$H-NMR spectrum of the sample was measured. A high-resolution nuclear magnetic resonance spectrometer (400 MHz Nuclear Magnetic Resonance, NMR), model: Varian Mercury 40, used to identify the structure of the sample, with deuterated dimethyl sulfoxide (DMSO-$d_6$) or deuterated chloroform (Chloroform-d) as solvent, the $^1$H-NMR of the sample was measured, the chemical shift was in parts per million (ppm), and the coupling constant (J) was in hertz (Hz). From the $^1$H-NMR spectrum as shown in FIG. 1(b), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the methyl characteristic peak of the terminal ketone appeared at 2.52 ppm, the benzene ring characteristic peak of the terminal ketone appeared at 7.32 ppm and 7.98 ppm, and the hydroxyl characteristic peak of the oligo(2,6-dimethylphenyl ether) at 4.55 ppm disappeared, confirming that the terminal hydroxyl group had been reacted and the structure was correct. The number average molecular weight was 3785 g/mole and the weight average molecular weight was 4378 g/mole by gel permeation chromatography.

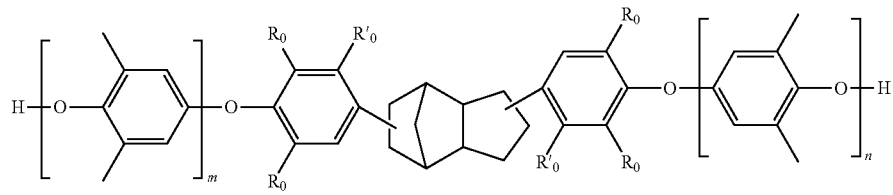

[Embodiment 2-1] Synthesis of (2,6-Dimethylphenyl Ether) Oligomer (Oligomer B-1) Containing a Diketone Structure In the following, taking $R_2$ as methyl group as an example, this reaction step was only for example, and the present invention was not limited to this. In a 100 ml three-necked reactor, 10.00 g (3.35 mmole) of phenolic terminal (2,6-dimethylphenyl ether) oligomer containing the adduct structure of "dicyclopentadiene and 2,6-dimethylphenol", 1.018 g (7.37 mmole) of 4-fluoroacetophenone, 1.018 g (7.37 mmole) of potassium carbonate ($K_2CO_3$), and 50 ml of dimethylformamide were added. Then, the temperature was raised to 120° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain a brown powder with a yield of 82%, as shown in the figure below. Wherein, n and m are each independently an integer from 0 to 300.

[Embodiment 2-2] Synthesis of (2,6-Dimethylphenyl Ether) Oligomer (Oligomer B-2) Containing a Diketone Structure In the following, taking $R_2$ as methyl group as an example, this reaction step was only for example, and the present invention was not limited to this. In a 100 ml three-neck reactor, 1 g (0.625 mmole) of SA90, 0.2158 g (1.5625 mmole) of 4-fluoroacetophenone, 0.2158 g (1.5625 mmole) of potassium carbonate ($K_2CO_3$) and 10 mL of dimethylformamide were added. Then, the temperature was raised to 140° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain a creamy white powder with a yield of 82%, as shown in the figure below. Wherein, n and m are each independently an integer from 0 to 300.

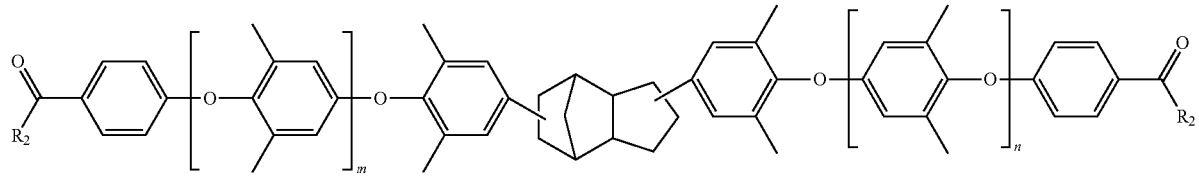

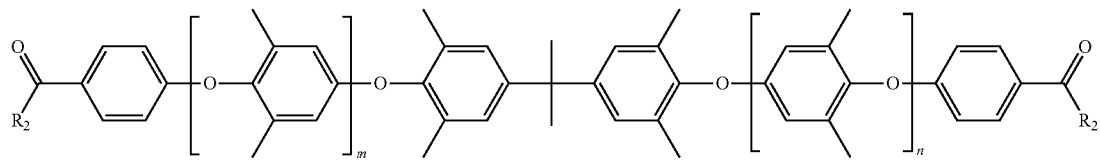

Next, the ¹H-NMR spectrum of the sample was measured. A high-resolution nuclear magnetic resonance spectrometer (400 MHz Nuclear Magnetic Resonance, NMR), model: Varian Mercury 40, used to identify the structure of the sample, with deuterated dimethyl sulfoxide (DMSO-$d_6$) or deuterated chloroform (Chloroform-d) as solvent, the ¹H-NMR of the sample was measured, the chemical shift was in parts per million (ppm), and the coupling constant (J) was in hertz (Hz). From the ¹H-NMR spectrum, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the methyl characteristic peak of the terminal ketone appeared at 2.65 ppm, the benzene ring characteristic peak of the terminal ketone appeared at 6.97 ppm and 7.89 ppm, and the hydroxyl characteristic peak of the oligo(2,6-dimethylphenyl ether) at 4.55 ppm disappeared, confirming that the terminal hydroxyl group had been reacted and the structure was correct. The number average molecular weight was 3613 g/mole and the weight average molecular weight was 5619 g/mole by gel permeation chromatography.

[Embodiment 3-1] Synthesis of (2,6-Dimethylphenyl Ether) Oligomer (Oligomer C-1) Containing a Dialdehyde Structure In the following, taking $R_2$ as hydrogen as an example, this reaction step was only for example, and the present invention was not limited to this. In a 100 ml three-necked reactor, 10.00 g (3.35 mmole) of phenolic terminal (2,6-dimethylphenyl ether) oligomer containing the adduct structure of "dicyclopentadiene and 2,6-dimethylphenol", 1.036 g (7.37 mmole) of 4-chlorobenzaldehyde, 1.018 g (7.37 mmole) of potassium carbonate ($K_2CO_3$), and 50 ml of dimethylformamide were added. Then, the temperature was raised to 140° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain a brown powder with a yield of 75%, as shown in the figure below. Wherein, n and m are each independently an integer from 0 to 300.

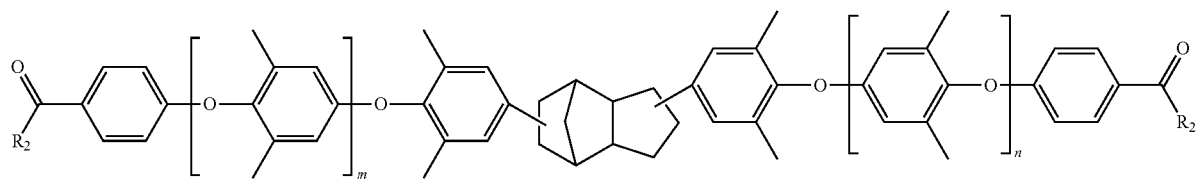

From the ¹H-NMR spectrum as shown in FIG. 1(c), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the characteristic peak of the terminal aldehyde group appeared at 9.88 ppm, the benzene ring characteristic peak of the terminal aldehyde appeared at 7.81 ppm, and the hydroxyl characteristic peak of the oligo(2,6-dimethylphenyl ether) at 4.55 ppm disappeared, confirming that the terminal hydroxyl group had been reacted and the structure was correct. The number average molecular weight was 3552 g/mole and the weight average molecular weight was 4561 g/mole by gel permeation chromatography.

[Embodiment 3-2] Synthesis of (2,6-Dimethylphenyl Ether) Oligomer (Oligomer C-2) Containing a Dialdehyde Structure In the following, taking $R_2$ as hydrogen as an example, this reaction step was only for example, and the present invention was not limited to this. In a 100 ml three-neck reactor, 1 g (0.625 mmole) of SA90, 0.2196 g (1.5625 mmole) of 4-chlorobenzaldehyde, 0.2191 g (1.5625 mmole) of potassium carbonate ($K_2CO_3$) and 10 mL of dimethylformamide were added. Then, the temperature was raised to 130° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain a brown powder with a yield of 69%, as shown in the figure below. Wherein, n and m are independently an integer from 0 to 300.

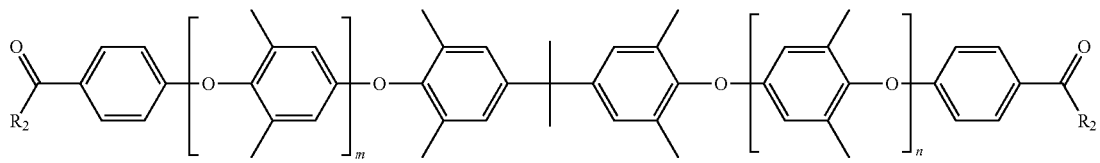

From the $^1$H-NMR spectrum, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the characteristic peak of the terminal aldehyde group appeared at 9.89 ppm, the benzene ring characteristic peak of the terminal aldehyde group appeared at 6.88 ppm and 7.89 ppm, and the hydroxyl characteristic peak of the oligo(2,6-dimethylphenyl ether) at 4.55 ppm disappeared, confirming that the terminal hydroxyl group had been reacted and the structure was correct. The number average molecular weight was 3139 g/mole and the weight average molecular weight was 4214 g/mole by gel permeation chromatography.

[Preparation for the Phosphinated Bisphenol (2,6-Dimethylphenyl Ether) Oligomer]

The phosphinated bisphenol (2,6-dimethylphenyl ether) oligomer of the present invention can be formed, for example, by the reaction steps shown below, which are only an example, but the present invention is not limited thereto. The bifunctional (2,6-dimethylphenyl ether) oligomer represented by Formula (4), 9,10-dihydro-9-oxa-10-phosphaphenanthrene-10-oxide and phenol were reacted under the catalysis of an acid catalyst to obtain a phosphinated bisphenol (2,6-dimethylphenyl ether) oligomer, and the product was shown in the figure below.

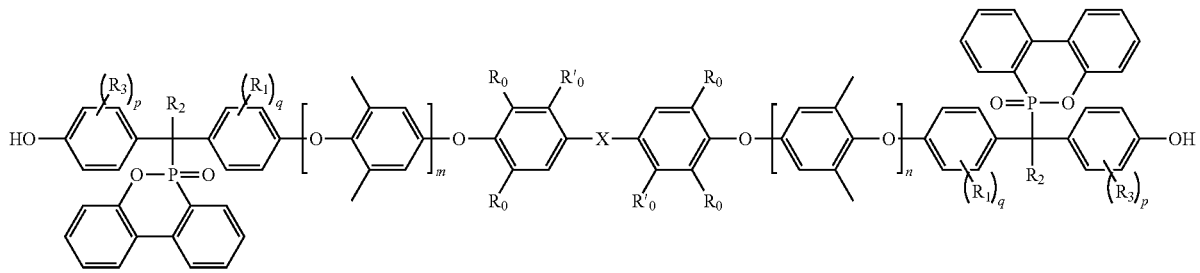

wherein X is a single bond, —$CH_2$—, —O—, —$C(CH_3)_2$— or

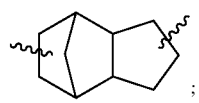

;

$R_2$ is hydrogen, C1-C6 alkyl or phenyl, n and m are each independently an integer from 0 to 300.

[Embodiment 4-1] Synthesis of Phosphinated Bisphenol (2,6-Dimethylphenyl Ether) Oligomer (Oligomer D-1) Containing the Adduct Structure of "Dicyclopentadiene and 2,6-Dimethylphenol"

In the following, taking $R_2$ as methyl group as an example, this reaction step was only for example, and the present invention was not limited to this. In a 100 ml three-neck reactor, 10.00 g (3.1 mmole) of diketone (2,6-dimethylphenyl ether) oligomer B-1, 1.67 g (7.75 mmole) of 9,10-dihydro-9-oxa-10-phosphaphenanthrene-10-oxide (DOPO), 0.67 g (4 wt % of DOPO content) of sulfuric acid, and 40.00 g of phenol were added. Then, the temperature was raised to 140° C. and reacted for 24 hours in a nitrogen atmosphere. After the reaction, it was cooled to room temperature. The mixture was poured into ethanol for precipitation, and washed with ethanol for several times. Finally, the filter cake was vacuum-dried at 60° C. to obtain a brown powder with a yield of 84%, as shown in the figure below. Wherein, n and m are each independently an integer from 0 to 300.

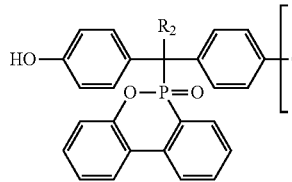
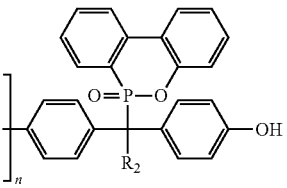

From the $^1$H-NMR spectrum as shown in FIG. 1(d), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the benzene ring characteristic peak of the DOPO appeared at 6 to 8 ppm, and the methyl characteristic peak of the terminal ketone at 2.6 ppm disappeared, confirming that the structure was correct. The number average molecular weight was 4088 g/mole and the weight average molecular weight was 5190 g/mole by gel permeation chromatography.

[Embodiment 4-2] Synthesis of Phosphorus-Containing Bisphenol (2,6-Dimethylphenyl Ether) Oligomer (Oligomer D-2)

In the following, taking $R_2$ as methyl group as an example, this reaction step was only for example, and the present invention was not limited to this. In a 100 ml three-necked reactor, 1 g (0.5435 mmole) of diketone (2,6-dimethylphenyl ether) oligomer B-2, 0.4670 g (2.174 mmole) of 9,10-dihydro-9-oxa-10-phosphaphenanthrene-10-oxide (DOPO), 0.0186 g (4% by weight of DOPO content) of sulfuric acid, and 10 g of phenol were added. Then, the temperature was raised to 150° C. and reacted for 24 hours in a nitrogen atmosphere. After the reaction, it was cooled to room temperature. The mixture was poured into ethanol for precipitation, and washed with ethanol for several times. Finally, the filter cake was vacuum-dried at 60° C. to obtain a creamy white powder with a yield of 84%, as shown in the figure below. Wherein, n and m are each independently an integer from 0 to 300.

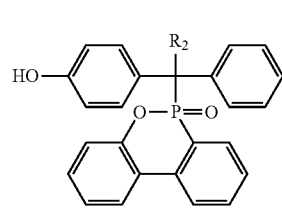
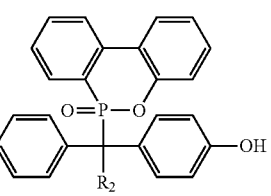

From the $^1$H-NMR spectrum, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the 9,10-dihydro-9-oxa-10-phosphaphenanthrene-10-oxide (DOPO) appeared at 6 to 8 ppm, and the methyl characteristic peak of the terminal ketone at 2.65 ppm disappeared, confirming that the structure was correct. The number average molecular weight was 3991 g/mole and the weight average molecular weight was 5845 g/mole by gel permeation chromatography.

[Embodiment 5-1] Synthesis of Phosphinated Bisphenol (2,6-Dimethylphenyl Ether) Oligomer (Oligomer E-1) Containing the Adduct Structure of "Dicyclopentadiene and 2,6-Dimethylphenol"

In the following, taking $R_2$ as hydrogen as an example, this reaction step was only for example, and the present invention was not limited to this. In a 100 ml three-neck reactor, 10.00 g (3.1 mmole) of dialdehyde (2,6-dimethylphenyl ether) oligomer C-1, 1.67 g (7.75 mmole) of 9,10-aldehyde-9-oxa-10-phosphaphenanthrene-10-oxide (DOPO), 0.67 g (4 wt % of DOPO content) of sulfuric acid, and 40.00 g of phenol were added. Then, the temperature was raised to 140° C. and reacted for 24 hours in a nitrogen atmosphere. After the reaction, it was cooled to room temperature. The mixture was poured into methanol for precipitation, and washed with methanol for several times. Finally, the filter cake was vacuum-dried at 60° C. to obtain a brown powder with a yield of 78%, as shown in the figure below. Wherein, n and m are each independently an integer from 0 to 300.

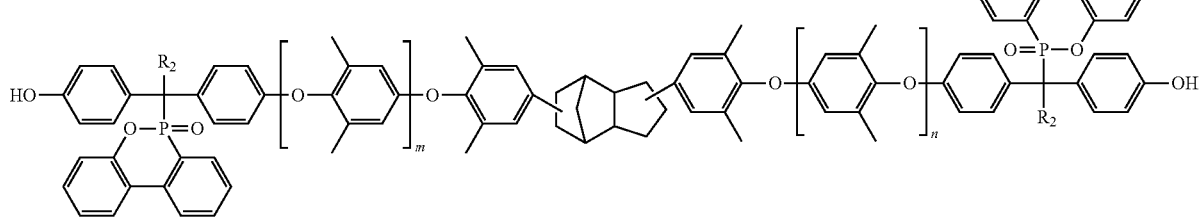

From the $^1$H-NMR spectrum as shown in FIG. 1(e), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the benzene ring characteristic peak of the DOPO appeared at 6 to 8 ppm, and the methyl characteristic peak of the terminal aldehyde at 9.88 ppm disappeared, and the hydrogen characteristic peak of the O=P—C—H structure generated at 4.22 ppm, confirming that the structure was correct.

[Embodiment 5-2] Synthesis of Phosphorus-Containing Bisphenol (2,6-Dimethylphenyl Ether) Oligomer (Oligomer E-2)

In the following, taking $R_2$ as hydrogen as an example, this reaction step was only for example, and the present invention was not limited to this. In a 100 ml three-necked reactor, 1 g (0.5525 mmole) of dialdehyde (2,6-dimethylphenyl ether) oligomer C-2, 0.358 g (1.657 mmole) of 9,10-aldehyde-9-oxa-10-phosphaphenanthrene-10-oxide (DOPO), 0.0143 g (4% by weight of DOPO content) of sulfuric acid, and 10 g of phenol were added. Then, the temperature was raised to 140° C. and reacted for 24 hours in a nitrogen atmosphere. After the reaction, it was cooled to room temperature. The mixture was poured into methanol for precipitation, and washed with methanol for several times. Finally, the filter cake was vacuum-dried at 60° C. to obtain a gray powder with a yield of 68%, as shown in the figure below. Wherein, n and m are each independently an integer from 0 to 300.

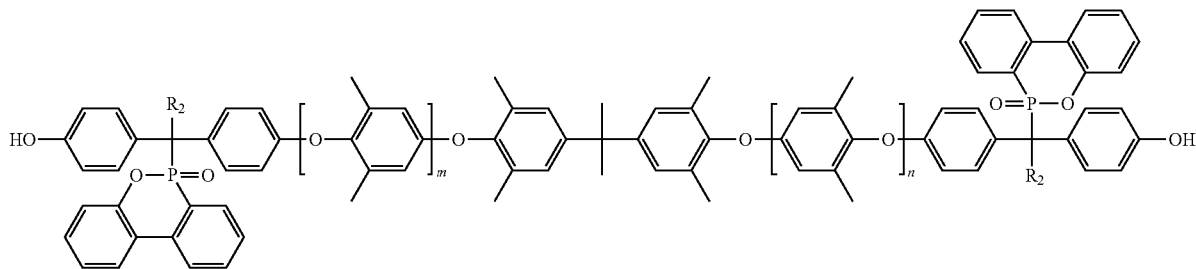

From the $^1$H NMR spectrum, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the 9,10-dihydro-9-oxa-10-phosphaphenanthrene-10-oxide (DOPO) appeared at 6 to 8 ppm, and the methyl characteristic peak of the terminal aldehyde at 9.89 ppm disappeared, and the hydrogen characteristic peak of the O=P—C—H structure generated at 4.22 ppm, confirming that the structure was correct. The number average molecular weight was 3399 g/mole and the weight average molecular weight was 4524 g/mole by gel permeation chromatography.

[Preparation for the Phosphinated (2,6-Dimethylphenyl Ether) Oligomer Containing an Unsaturated Group]

The bifunctional (2,6-dimethylphenyl ether) oligomer F-1 containing an unsaturated group of the present invention could be formed, for example, by the reaction steps shown below, which are only an example, but the present invention is not limited thereto. The phosphinated bisphenol (2,6-dimethylphenyl ether) oligomer D-1 containing the adduct structure of "dicyclopentadiene and 2,6-dimethylphenol" was terminally functionalized, and the methyl acrylic anhydride (methacrylic anhydride) was added under the catalysis of nitrogen or basic catalyst, to obtain the phosphinated (2,6-dimethylphenyl ether) oligomer F-1 containing the adduct structure of "dicyclopentadiene and 2,6-dimethylphenol" by reaction. The structure of the product was as follows:

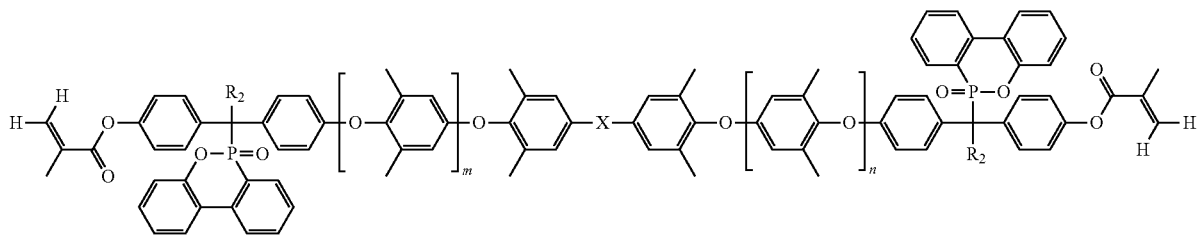

wherein X was a single bond, —CH$_2$—, —O—, —C(CH$_3$)$_2$— or

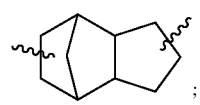

;

R$_2$ was hydrogen, C1-C6 alkyl or phenyl, n and m are each independently an integer from 0 to 300.

The phosphinated bisphenol (2,6-dimethylphenyl ether) oligomer D-1 containing the adduct structure of "dicyclopentadiene and 2,6-dimethylphenol" was terminally functionalized, and 3-vinylbenzyl chloride, 4-vinylbenzyl chloride or mixture thereof was added under the catalysis of a basic catalyst, to obtain the phosphinated (2,6-dimethylphenyl ether) oligomer G-1 containing the adduct structure of "dicyclopentadiene and 2,6-dimethylphenol" by reaction. The reaction formula was as follows:

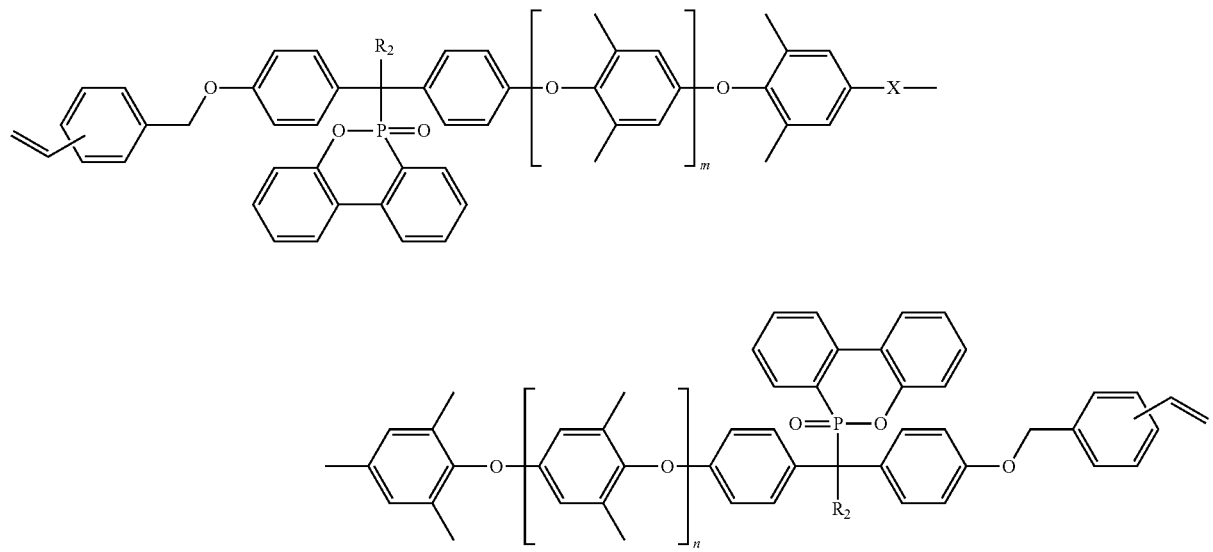

wherein X is a single bond, —CH$_2$—, —O—, —C(CH$_3$)$_2$— or

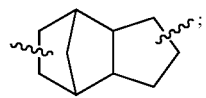

R$_2$ is hydrogen, C1-C6 alkyl or phenyl, n and m are each independently an integer from 0 to 300.

[Embodiment 6-1] Synthesis of Phosphinated (2,6-Dimethylphenyl Ether) Oligomer (Oligomer F-1) Containing Dicyclopentadiene Structure and Methacrylate Group In the following, taking R$_2$ as methyl group as an example, this reaction step was only for example, and the present invention was not limited to this. In a 100 ml three-necked reactor, 10.00 g (2.63 mmole) of phosphinated bisphenol (2,6-dimethylphenyl ether) oligomer D-1 containing the adduct structure of "dicyclopentadiene and 2,6-dimethylphenol", 0.93 g (6.05 mmole) of methacrylic anhydride, 0.020 g (1 wt % of methacrylic anhydride content) of sodium acetate, and 50 ml of dimethylacetamide were added. Then, the temperature was raised to 85° C. and reacted for 24 hours in a nitrogen atmosphere. After the reaction, it was cooled to room temperature. The mixture was poured into methanol for precipitation, and washed with methanol for several times. Finally, the filter cake was vacuum-dried at 60° C. to obtain light yellow powder with a yield of 81%, wherein R$_2$ was methyl group, as shown in the figure below. Wherein, n and m are each independently an integer from 0 to 300.

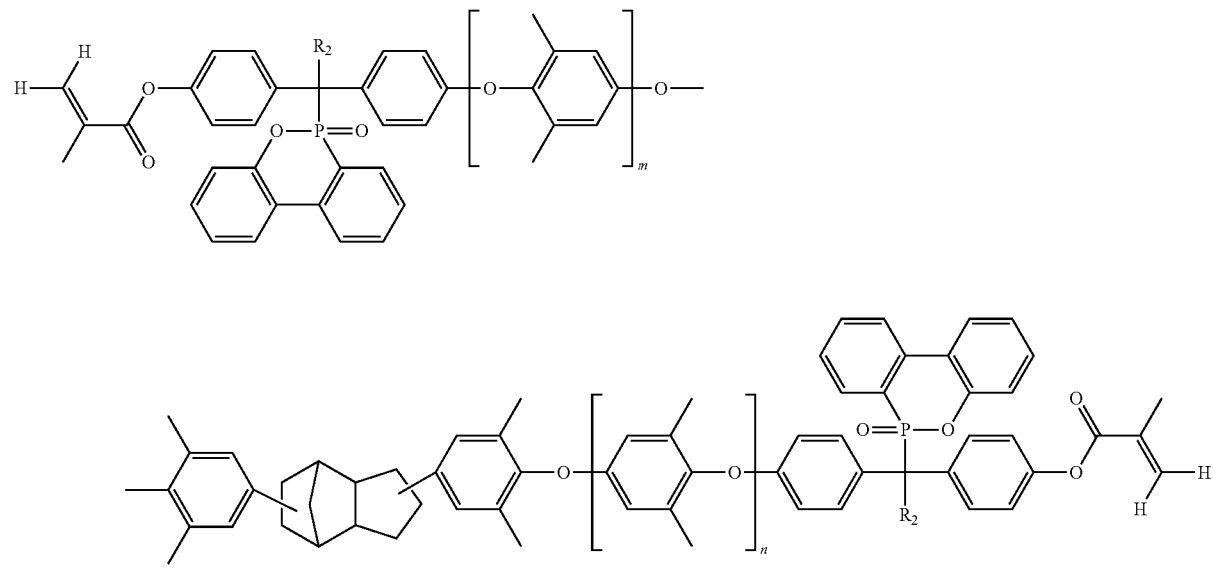

From the $^1$H-NMR spectrum as shown in FIG. 2(f), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the benzene ring characteristic peak of the DOPO appeared at 6 to 8 ppm, the double bond characteristic peak of the terminal acrylic group appeared at 5.77 and 6.34 ppm, confirming that the structure was correct. The number average molecular weight was 4640 g/mole and the weight average molecular weight was 5382 g/mole by gel permeation chromatography.

[Embodiment 6-2] Synthesis of Phosphorus-Containing (2,6-Dimethylphenyl Ether) Oligomer (Oligomer F-2)

In the following, taking $R_2$ as methyl group as an example, this reaction step was only for example, and the present invention was not limited to this. In a 100 ml three-necked reactor, 1 g (0.4132 mmole) of phosphorus-containing bisphenol (2,6-dimethylphenyl ether) oligomer D-2, 0.3376 g (2.19 mmole) of methacrylic anhydride, 0.0034 g (1% by weight of methacrylic anhydride content) of sodium acetate, and 10 ml of dimethylacetamide were added. Then, the temperature was raised to 80° C. and reacted for 24 hours in a nitrogen atmosphere. After the reaction, it was cooled to room temperature. The mixture was poured into methanol for precipitation, and washed with methanol for several times. Finally, the filter cake was vacuum-dried at 60° C. to obtain light yellow powder with a yield of 81%, as shown in the figure below. Wherein, n and m are each independently an integer from 0 to 300.

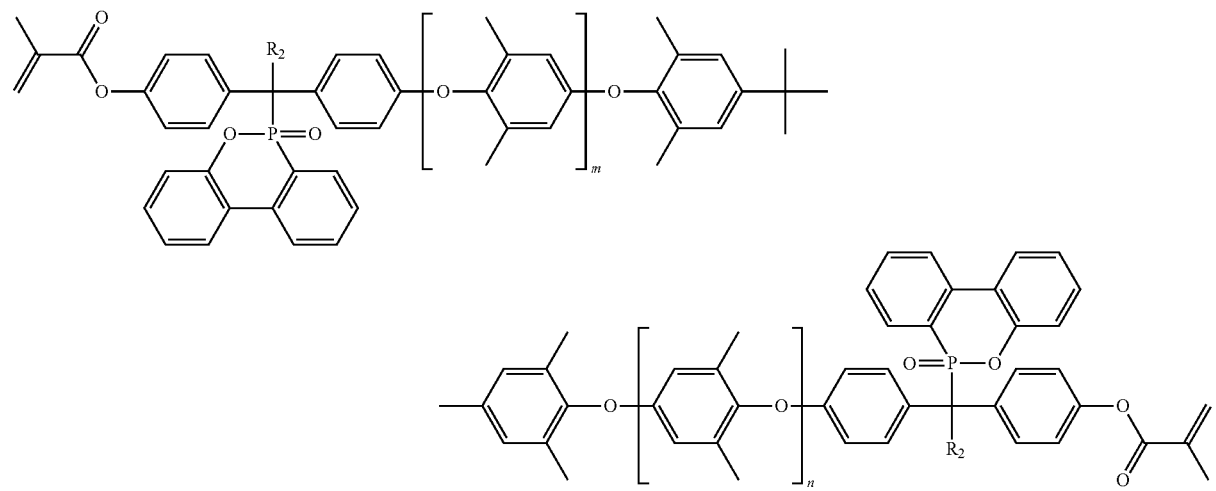

Figure 3:
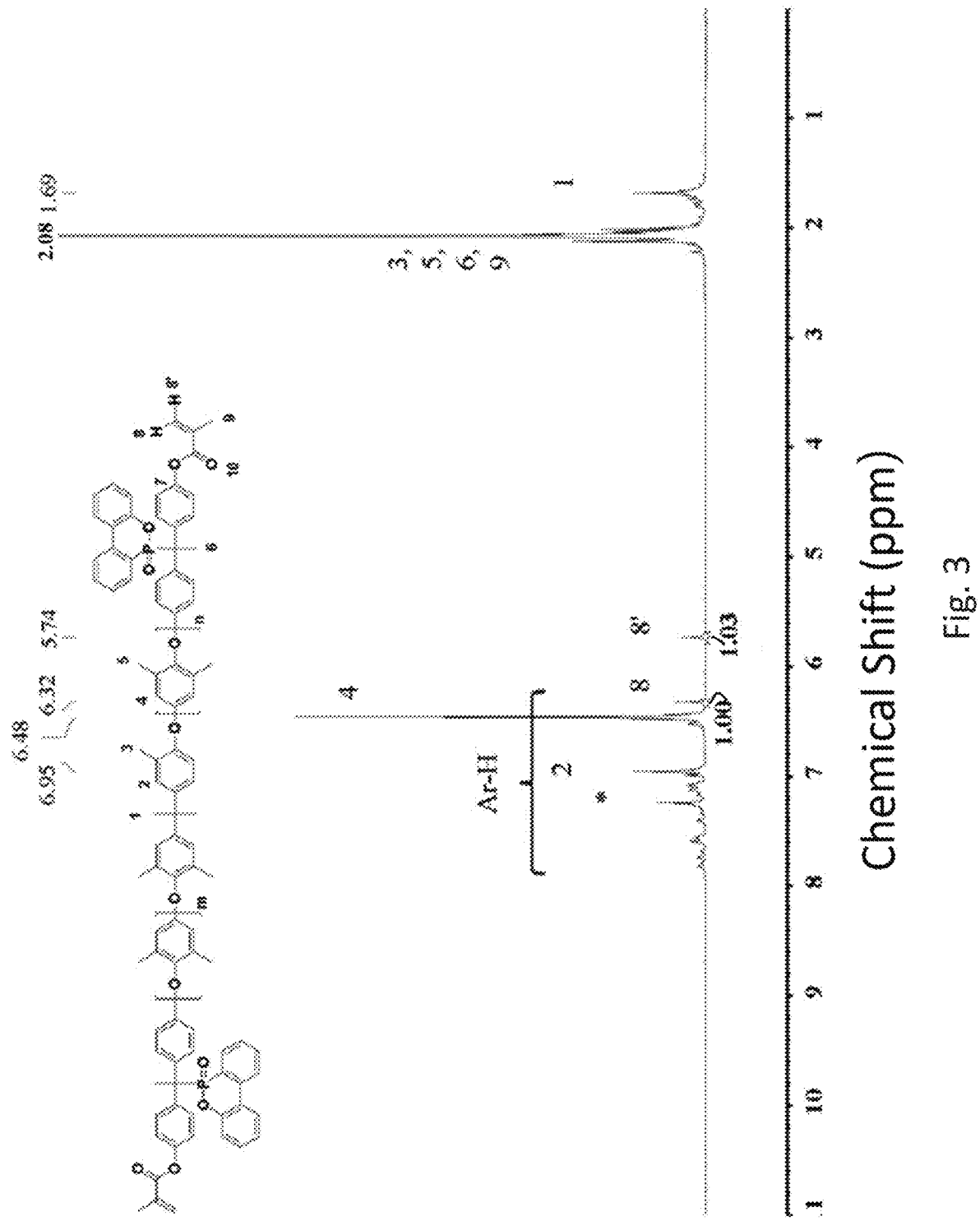

From the $^1$HNMR spectrum as shown in FIG. 3, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the DOPO appeared at 6 to 8 ppm, the double bond characteristic peak of the terminal acrylic group appeared at 5.75 and 6.33 ppm, confirming that the structure was correct. The number average molecular weight was 4601 g/mole and the weight average molecular weight was 6004 g/mole by gel permeation chromatography.

[Embodiment 6-3] Synthesis of Phosphorus-Containing (2,6-Dimethylphenyl Ether) Oligomer (Oligomer F-3)

In the following, taking $R_2$ as hydrogen as an example, this reaction step was only for example, and the present invention was not limited to this. In a 100 ml three-necked reactor, 1 g (0.4180 mmole) of phosphorus-containing bisphenol (2,6-dimethylphenyl ether) oligomer E-2, 0.1933 g (1.254 mmole) of methacrylic anhydride, 0.0019 g (1% by weight of methacrylic anhydride content) of sodium acetate, and 10 ml of dimethylacetamide were added. Then, the temperature was raised to 50° C. and reacted for 12 hours in a nitrogen atmosphere. After the reaction, it was cooled to room temperature. The mixture was poured into methanol for precipitation, and washed with methanol for several times. Finally, the filter cake was vacuum-dried at 60° C. to obtain a brown powder with a yield of 70%, as shown in the figure below. Wherein, n and m are each independently an integer from 0 to 300.

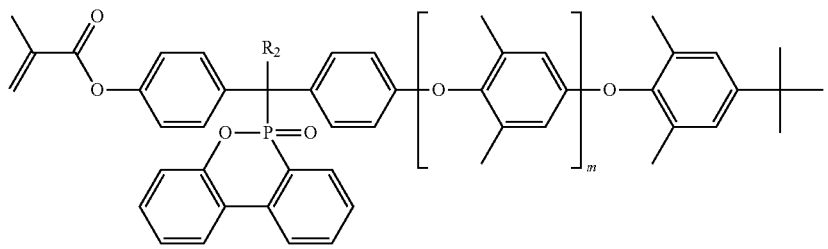

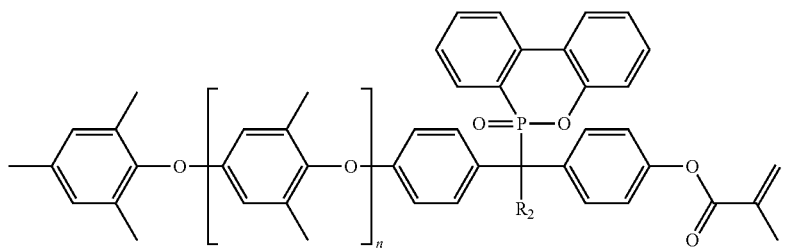

Figure 5:
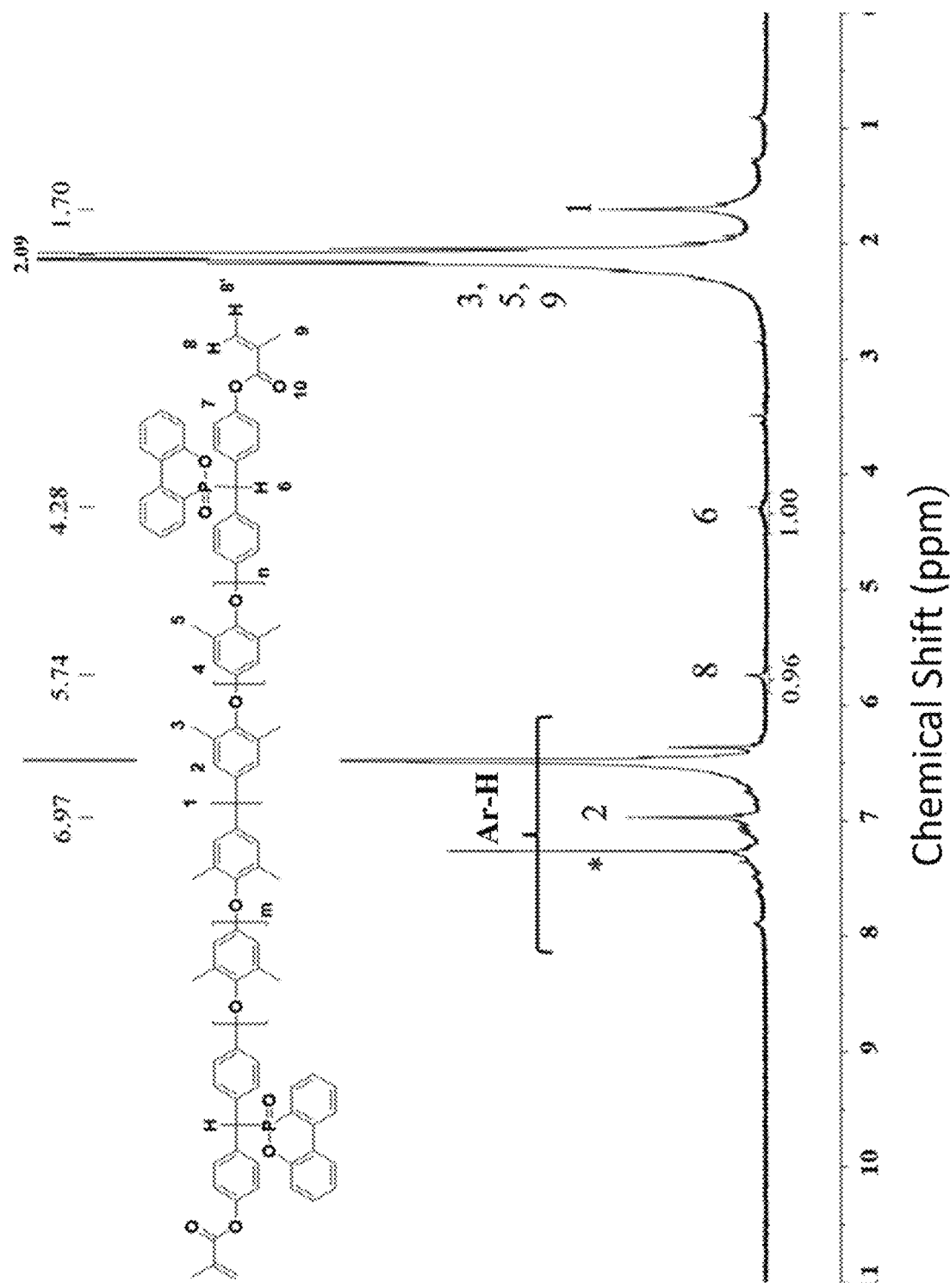

From the ¹HNMR spectrum as shown in FIG. 5, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the DOPO appeared at 6 to 8 ppm, the double bond characteristic peak of the terminal acrylic group appeared at 5.74 ppm, the hydrogen characteristic peak of the O=P—C—H structure shifted to 4.31 ppm, confirming that the structure was correct.

[Embodiment 7-1] Synthesis of Phosphinated (2,6-Dimethylphenyl Ether) Oligomer (Oligomer G-1) Containing Dicyclopentadiene Structure and Styrene Group In the following, taking $R_2$ as methyl group as an example, this reaction step was only for example, and the present invention was not limited to this. In a 100 ml three-necked reactor, 10.00 g (2.63 mmole) of phosphinated bisphenol (2,6-dimethylphenyl ether) oligomer D-2 containing the adduct structure of "dicyclopentadiene and 2,6-dimethylphenol", 0.92 g (6.05 mmole) of 4-vinylbenzyl chloride, 0.442 g (5.52 mmole) of 20% sodium hydroxide aqueous solution ($NaOH_{(aq)}$) and 50 ml of dimethylacetamide were added. Then, the temperature was raised to 70° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain light yellow powder with a yield of about 86%, as shown in the figure below; wherein $R_2$ was methyl group, as shown in the figure below. Wherein, n and m are each independently an integer from 0 to 300.

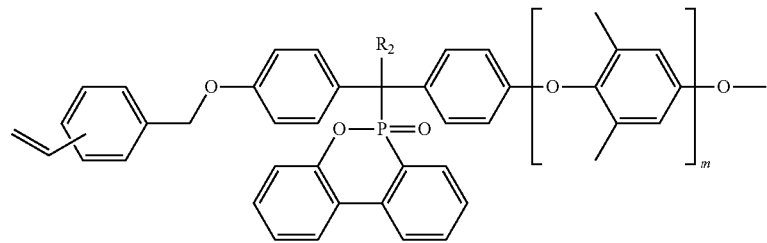

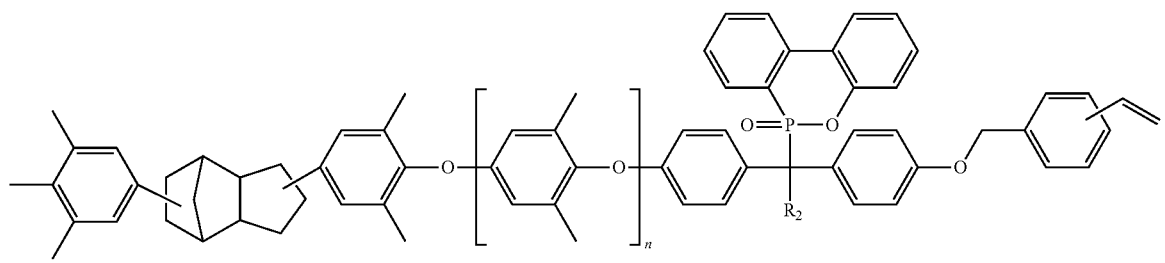

Figure 2:
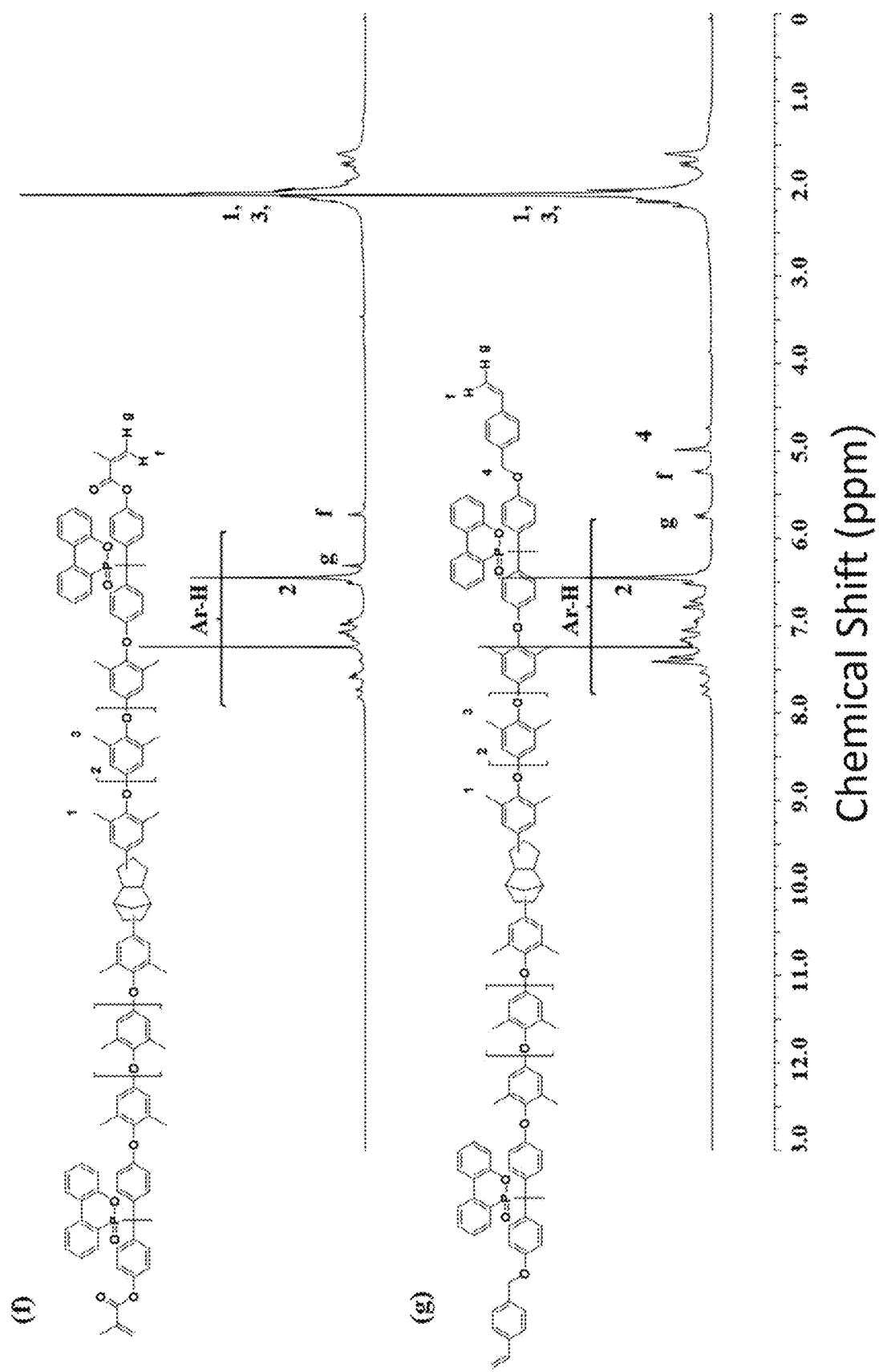

From the 1H-NMR spectrum as shown in FIG. 2(*g*), it could be observed that the benzene ring characteristic peak of the oligo(2,6-dimethylphenyl ether) appeared at 6.5 ppm, the methyl characteristic peak of the oligo(2,6-dimethylphenyl ether) appeared at 2.10 ppm, the benzene ring characteristic peak of the DOPO appeared at 6 to 8 ppm, the double bond characteristic peak of the terminal styrene group appeared at 5.28 ppm and 5.79 ppm, respectively, confirming that the structure was correct. The number average molecular weight was 5281 g/mole and the weight average molecular weight was 6482 g/mole by gel permeation chromatography.

[Embodiment 7-2] Synthesis of Phosphorus-Containing (2,6-Dimethylphenyl Ether) Oligomer (Oligomer G-2)

In the following, taking $R_2$ as methyl group as an example, this reaction step was only for example, and the present invention was not limited to this. In a 100 ml three-necked reactor, 1 g (0.4132 mmole) of phosphorus-containing bisphenol (2,6-dimethylphenyl ether) oligomer D-2, 0.3468 g (2.2726 mmole) of 4-vinylbenzyl chloride, 0.2855 g (2.066 mmole) of potassium carbonate ($K_2CO_3$) and 10 ml of dimethylacetamide were added. Then, the temperature was raised to 100° C. and reacted for 24 hours in a nitrogen atmosphere. After the reaction, it was cooled to room temperature. The mixture was poured into methanol water for precipitation, and washed with methanol water for several times. Finally, the filter cake was vacuum-dried at 60° C. to obtain light yellow powder with a yield of about 86%, and the structure was shown in the figure below. Wherein, n and m are each independently an integer from 0 to 300.

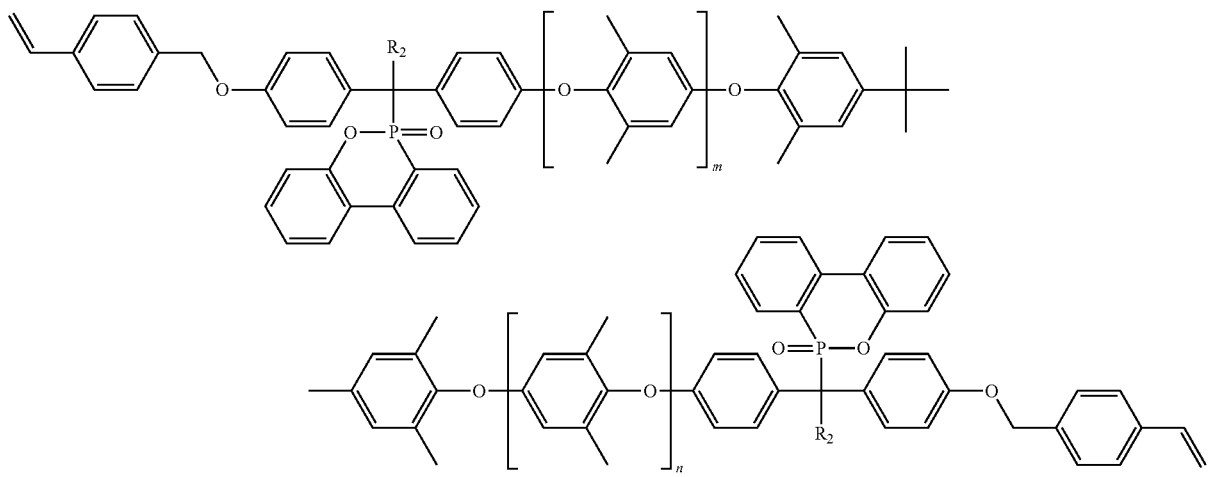

Figure 4:
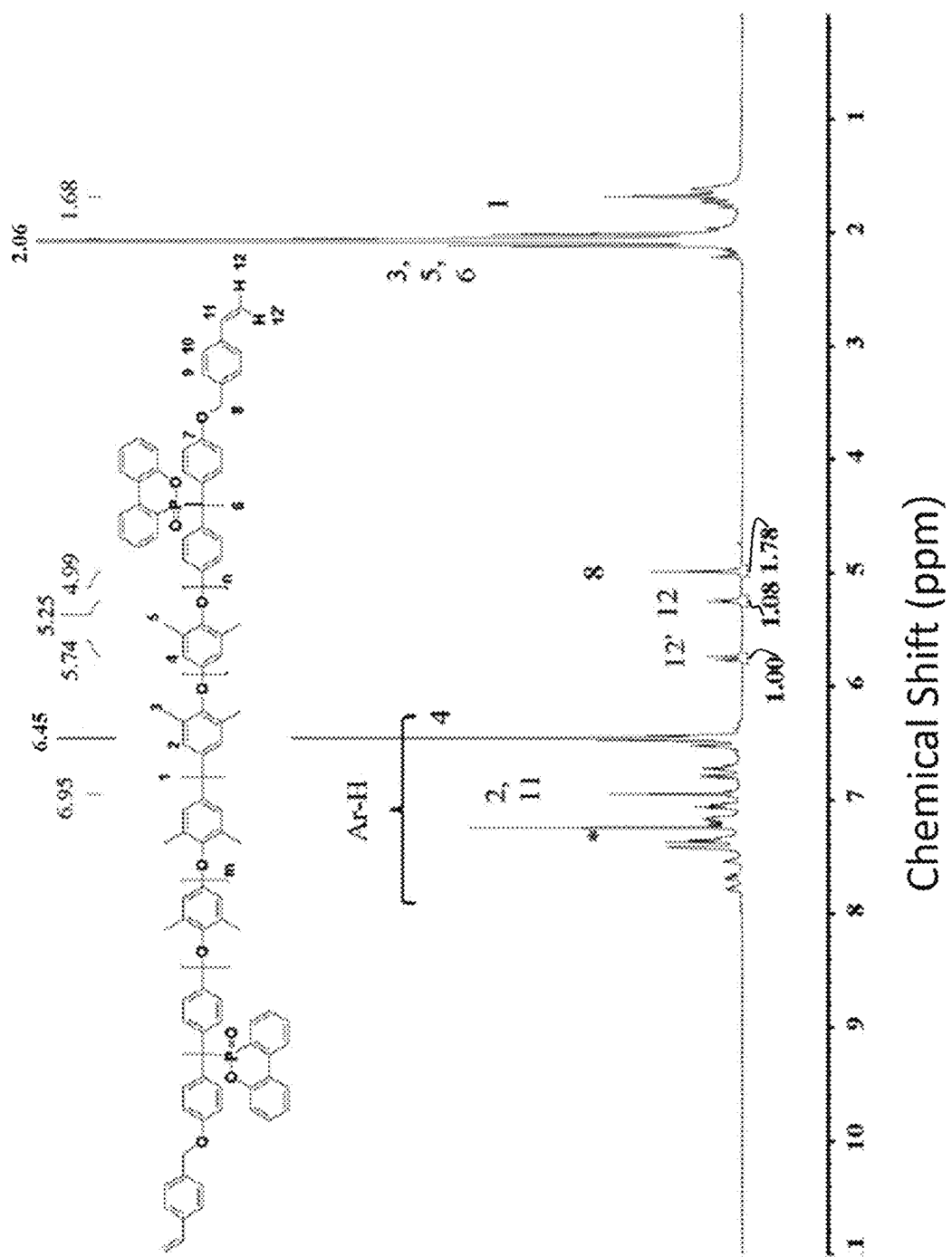

From the $^1$HNMR spectrum as shown in FIG. 4, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the 9,10-dihydro-9-oxa-10-phosphaphenanthrene-10-oxide (DOPO) appeared at 6 to 8 ppm, the double bond characteristic peak of the terminal styrene group appeared at 5.27 ppm and 5.78 ppm, respectively, confirming that the structure was correct. The number average molecular weight was 4768 g/mole and the weight average molecular weight was 6696 g/mole by gel permeation chromatography.

[Embodiment 7-3] Synthesis of Phosphorus-Containing (2,6-Dimethylphenyl Ether) Oligomer (Oligomer G-3)

In the following, taking $R_2$ as hydrogen as an example, this reaction step was only for example, and the present invention was not limited to this. In a 100 ml three-necked reactor, 1 g (0.4180 mmole) of phosphorus-containing bisphenol (2,6-dimethylphenyl ether) oligomer E-2, 0.1914 g (1.254 mmole) of 4-vinylbenzyl chloride, 0.1155 g (0.4180 mmole) of potassium carbonate ($K_2CO_3$) and 10 ml of dimethylacetamide were added. Then, the temperature was raised to 80° C. and reacted for 12 hours in a nitrogen atmosphere. After the reaction, it was cooled to room temperature. The mixture was poured into methanol for precipitation, and washed with methanol for several times. Finally, the filter cake was vacuum-dried at 60° C. to obtain a brown powder with a yield of 73%, and the structure was shown in the figure below. Wherein, n and m are independently an integer from 0 to 300.

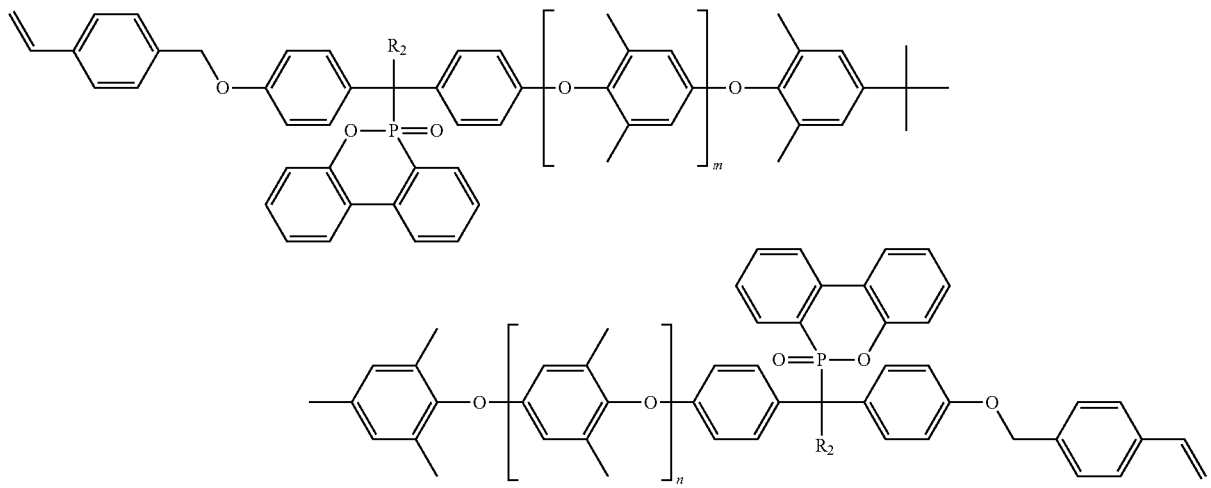

Figure 6:
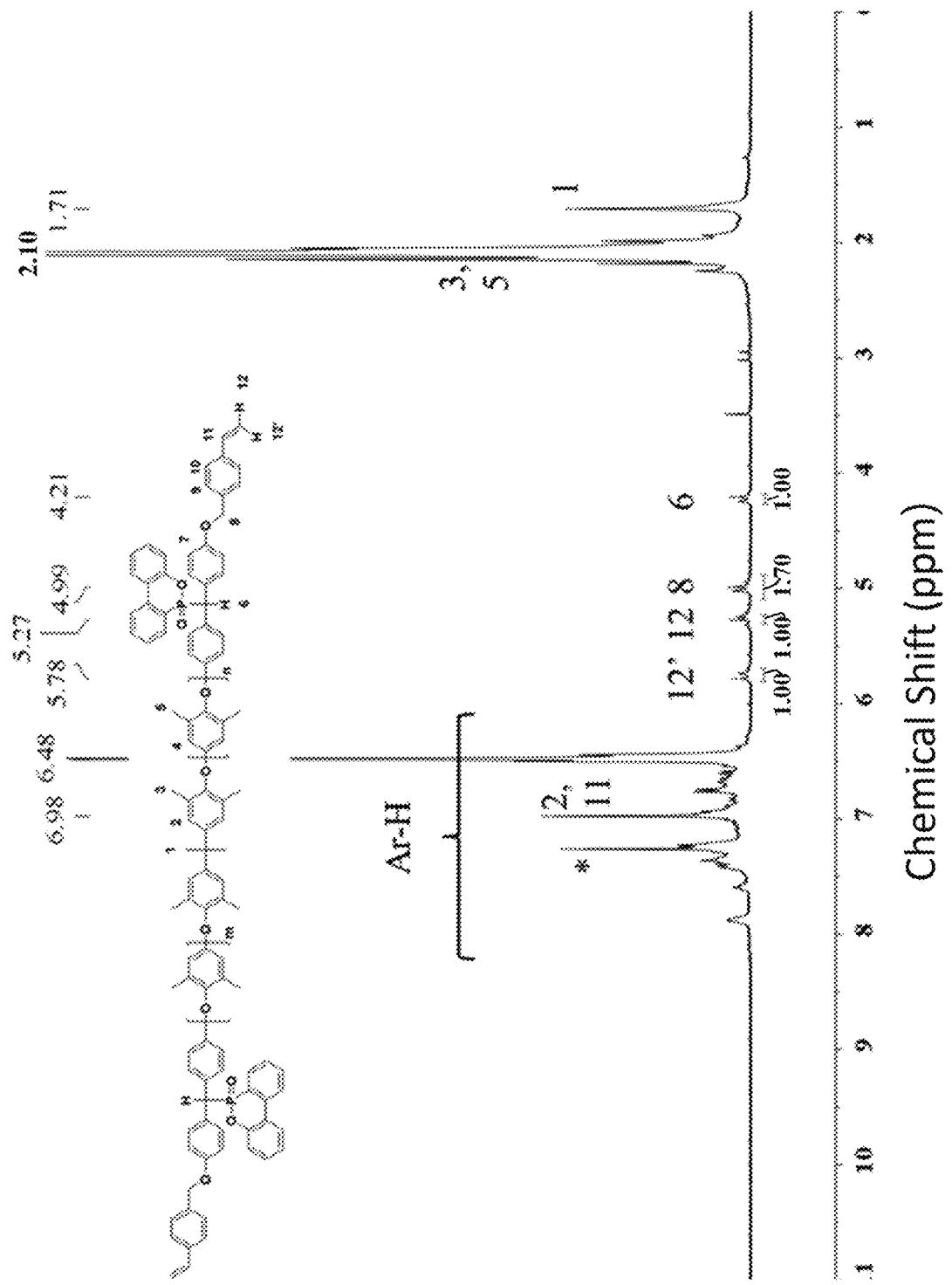

From the ¹HNMR spectrum as shown in FIG. 6, it could be observed that the benzene ring characteristic peak of the oligo(2,6-dimethylphenyl ether) appeared at 6.48 ppm, the methyl characteristic peak of the oligo(2,6-dimethylphenyl ether) appeared at 2.10 ppm, the benzene ring characteristic peak of the DOPO appeared at 6 to 8 ppm, the double bond characteristic peak of the terminal styrene group appeared at 5.26 ppm and 5.76 ppm, respectively, the hydrogen characteristic peak of the O=P—C—H structure shifted to 4.22 ppm, confirming that the structure was correct.

[Preparation for Cured Product]

The cured product of the present invention could be formed, for example, by the reaction steps shown below, which were only for example, but the present invention was not limited thereto. Using peroxide as the initiator, the phosphinated (2,6-dimethyl phenyl ether) oligomer containing an unsaturated group was used for the reaction of the unsaturated group, or the phosphinated (2,6-dimethyl phenyl ether) oligomer and epoxy resin were copolymerized to obtain cured products with high glass transition temperature, low dielectric constant, low loss tangent, and flame retardant properties.

[Embodiment 8-1] Preparation for Self-Crosslinked Cured Product of Phosphinated (2,6-Dimethylphenyl Ether) Oligomer F-1 Containing Dicyclopentadiene Structure and Methacrylic Ester The oligomer F-1 in Embodiment 6-1 was subjected to self-crosslinking curing reaction. The oligomer F-1 was added and formulated to the solution with a solid content of 20% with xylene, using 1% by weight tert-butyl cumene peroxide (TBCP) as a radical initiator. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, that was, the cured product of Embodiment 8-1.

[Embodiment 8-2] Preparation for Self-Crosslinked Cured Product of Phosphinated (2,6-Dimethylphenyl Ether) Oligomer F-2 Containing Methacrylate The oligomer F-2 in Embodiment 6-2 was subjected to self-crosslinking curing reaction. The oligomer F-2 was added and formulated with xylene to the solution with a solid content of 20%, using 1% by weight tert-butyl cumene peroxide (TBCP) as a radical initiator. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, that was, the cured product of Embodiment 8-2.

[Embodiment 9-1] Preparation for the Copolymer Cured Product of Phosphinated (2,6-Dimethylphenyl Ether) Oligomer F-1 Containing Dicyclopentadiene Structure and Methacrylic Ester with Epoxy Resin The oligomer F-1 in Embodiment 6-1 was cured with a commercially available epoxy resin HP-7200 (DIC Corporation Company). Epoxy resin and phosphinated (2,6-dimethylphenyl ether) oligomer containing dicyclopentadiene and methacrylic ester structure were added at an equivalent ratio of 1:1, followed by adding tert-butyl peroxide propylbenzene (TBCP) as a free radical initiator, and 4-dimethylaminopyridine (DMAP) as a crosslinking accelerator, the mixture from which was formulated with xylene to the solution with a solid content of 20%. Wherein, the content of tert-butyl cumene peroxide was 1% by weight of the oligomer F-1, and the content of 4-dimethylaminopyridine was 0.5% by weight of the epoxy resin. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, which was the cured product of Embodiment 9-1 (obtained by copolymerization of the oligomer F-1 in Embodiment 6-1 with epoxy resin).

[Embodiment 9-2] Preparation for the Copolymer Cured Product of Phosphinated (2,6-Dimethylphenyl Ether) Oligomer F-1 Containing Methacrylic Ester with Epoxy Resin The oligomer F-2 in Embodiment 6-2 was cured with a commercially available epoxy resin HP-7200 (DIC Corporation Company). Epoxy resin and phosphinated (2,6-dimethylphenyl ether) oligomer containing dicyclopentadiene and methacrylic ester structure were added at an equivalent ratio of 1:1, followed by adding tert-butyl peroxide propylbenzene (TBCP) as a free radical initiator, and 4-dimethylaminopyridine (DMAP) as a crosslinking accelerator, the mixture from which was formulated with xylene to the solution with a solid content of 20%. Wherein, the content of tert-butyl cumene peroxide was 1% by weight of the oligomer F-2, and the content of 4-dimethylaminopyridine was 0.5% by weight of the epoxy resin. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, which was the cured product of Embodiment 9-2 (obtained by copolymerization of the oligomer F-2 in Embodiment 6-2 with epoxy resin).

[Embodiment 10-1] Preparation for Self-Crosslinked Cured Product of Phosphinated (2,6-Dimethylphenyl Ether) Oligomer F-1 Containing Dicyclopentadiene Structure and Styrene Group The oligomer G-1 in Embodiment 7-1 was self-crosslinked. The oligomer G-1 was added and formulated with xylene to the solution with a solid content of 20%, using 1% by weight tert-butyl cumene peroxide (TBCP) as a radical initiator. Wherein, the content of tert-butyl cumene peroxide was 1% by weight of the phosphinated (2,6-dimethylphenyl ether) oligomer containing dicyclopentadiene structure and styrene group. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, which was the cured product of Embodiment 10-1 (obtained by self-crosslinking of the oligomer G-1 in Embodiment 7-1).

[Embodiment 10-2] Preparation for Self-Crosslinked Cured Product of Phosphinated (2,6-Dimethylphenyl Ether) Oligomer G-2 Containing Styrene Group The oligomer G-2 in Embodiment 7-2 was self-crosslinked. The oligomer G-2 was added and formulated with xylene to the solution with a solid content of 20%, using 1% by weight tert-butyl cumene peroxide (TBCP) as a radical initiator. Wherein, the content of tert-butyl cumene peroxide was 1% by weight of the phosphinated (2,6-dimethylphenyl ether) oligomer containing dicyclopentadiene structure and styrene group. After the mixing was uniform, the mixture was poured into the mold and cured by programming temperature in a nitrogen environment. The temperature programming conditions were 80° C. (for 12 hours), 120° C. (for 2 hours), 180° C. (for 2 hours), 200° C. (for 2 hours), 220° C. (for 2 hours) and 240° C. (for 2 hours). After demolding, a dark brown cured product was obtained, which was the cured product of Embodiment 10-2 (obtained by self-crosslinking of the oligomer G-2 in Embodiment 7-2).

Comparative Example 1

According to the experimental procedure of Embodiment 8, the commercial product SA9000, a (2,6-dimethylphenyl ether) oligomer with methacrylic ester as terminal group, was self-crosslinked to obtain a dark brown cured product after demolding (Comparative example 1).

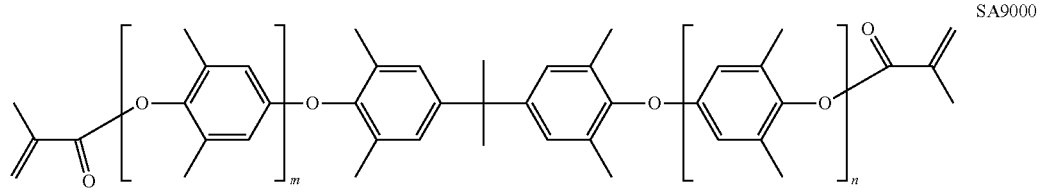

SA9000

Comparative Example 2

According to the experimental procedure of Embodiment 9, the commercial product SA9000, a (2,6-dimethylphenyl ether) oligomer with methacrylic ester as terminal group, and the commercial epoxy resin HP-7200 were cured by copolymerization to obtain a dark brown cured product after demolding (Comparative example 2).

Comparative Example 3

According to the experimental procedure of Embodiment 8, the commercial product OPE-2St, a (2,6-dimethylphenyl ether) oligomer with styrene as terminal group, was self-crosslinked to obtain a dark brown cured product after demolding (Comparative example 3).

OPE-2St

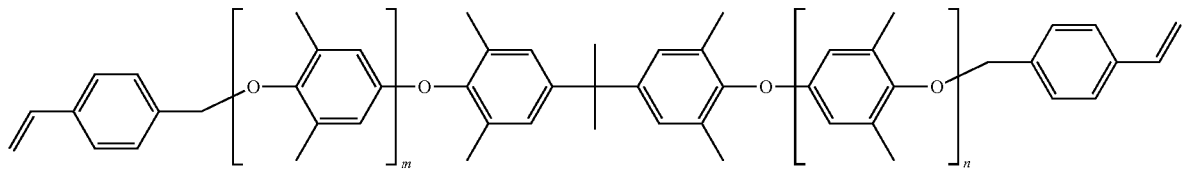

[Analysis of Product Solubility after Functionalization of Phosphorus-Containing Oligomers]

Table 1 was summarized as the molecular weight determination and solubility test of commercially available product SA90, commercially available product OPE-2St, commercially available product SA9000, Embodiment 6-1, Embodiment 6-2, Embodiment 7-1, and Embodiment 7-2. In this embodiment, the Gel Permeation Chromatography (GPC) (brand and model: Hitachi L2400) was used to determine the molecular weight: the column temperature was 40° C., the flow rate was set to 1.0 mL/min, and then, the sample to be tested was dissolved in N-methylpyrrolidone (1-Methyl-2-pyrrolidone) in a ratio of 1:99, followed by filtering the solution through a 0.22 μm filter to obtain a solution, and then 25 μL from the solution was taken into the instrument, from which the number average molecular weight ($M_n$), weight average molecular weight ($M_w$), and molecular weight distribution (polydispersity index, PDI) of the sample were determined.

From the results in Table 1, it could be seen that the number average molecular weight ($M_n$) of Embodiment 6-1, Embodiment 6-2, Embodiment 7-1, and Embodiment 7-2 were all less than 7000, and the molecular weight distribution (PDI) was less than 2. In addition, in the solubility test, the products from Embodiment 6-1, Embodiment 6-2, Embodiment 7-1 and Embodiment 7-2 could be completely dissolved in dimethylacetamide, tetrahydrofuran, chloroform and toluene at room temperature, with excellent organic solubility.

1 Hz, the amplitude was 25 μm, and the temperature range was from 4° C. to 350° C. to determine the storage modulus and Tan δ curve, and obtain the glass transition temperature ($T_g$).

(2) Using Thermo-mechanical Analyzer (TMA) (brand and model: SII TMA/SS6100) to measure glass transition temperature (Tg) and Coefficient of thermal expansion (CTE): the sample was placed into the instrument to measure its length (film), the film was set to tension, the heating rate was 5° C./min, and the thermal expansion coefficient measurement range was 50-150° C.

(3) Using Thermo-gravimetric Analyzer (TGA) (brand and model: PerkinElmer Pyris 1 TGA) to measure the 5% thermogravimetric loss temperature (To %) of the sample and the coke residual percentage at 800° C. (Char yield, CY (%)): 3-5 mg of the test substance was taken and placed in a platinum pan, venting nitrogen (or air), increasing the temperature from 40° C. to 800° C. at a heating rate of 20° C./min, and calculating the thermal decomposition temperature from the thermal decomposition curve, and the residual weight percentage at 800° C., i.e. the coke residual percentage. Wherein, the 5% thermogravimetric loss temperature referred to the temperature at which the weight loss of the sample reached 5%, wherein the higher 5% thermogravimetric loss temperature represented the better thermal stability of the sample. The coke residual ratio at 800° C. referred to the residual weight ratio of the

TABLE 1

Molecular weight and solubility test

| Sample Code | $M_w$ (g/mol) | $M_n$ (g/mol) | PDI | Dimethylacetamide | Tetrahydrofuran | Chloroform | Toluene |
|---|---|---|---|---|---|---|---|
| SA90 | 4994 | 3494 | 1.43 | ++ | ++ | ++ | ++ |
| OPE-2St | 2552 | 2149 | 1.20 | ++ | ++ | ++ | ++ |
| SA9000 | 5360 | 3492 | 1.54 | ++ | ++ | ++ | ++ |
| Embodiment 6-1 | 5382 | 4640 | 1.16 | ++ | ++ | ++ | ++ |
| Embodiment 6-2 | 6004 | 4601 | 1.31 | ++ | ++ | ++ | ++ |
| Embodiment 7-1 | 6482 | 5281 | 1.23 | ++ | ++ | ++ | ++ |
| Embodiment 7-2 | 6696 | 4768 | 1.40 | ++ | ++ | ++ | ++ |

$^a$++ clear

[Thermal Properties Analysis of the Cured Product]

Table 2 was summarized as the thermal properties evaluation results from Comparative example 1, Comparative example 2, Comparative example 3, Embodiment 8-1, Embodiment 8-2, Embodiment 9-1, Embodiment 9-2, Embodiment 10-1, and Embodiment 10-2.

In this embodiment, the evaluation methods of thermal properties included: (1) using a Dynamic Mechanical Analyzer (DMA) (brand and model: Perkin-Elmer Pyris Diamond) to measure the glass transition temperature ($T_g$): the sample was cut to 2.0 cm×1.0 cm, the method used was tension, the heating rate was 5° C./min, the frequency was sample when the heating temperature reached 800° C., wherein the higher residual weight ratio at 800° C. represented the better thermal stability of the sample.

(4) Flame resistance measurement (UL-94 flame-retardant test): First preparation for a sample, that was, wrap a film of 8 in.×2 in. on a cylindrical support with a diameter of 0.5 in., and move the support so that the 5 in., the film was wound on the support, and the film not on the support stretched it into a cone shape to complete the sample preparation. Then, the sample prepared above was burned in a flame for 3 seconds, removing the fire source and recording the flame burning time as $t_1$, then waiting for the sample to cool down before performing a second combustion, the burning time was also 3 seconds, removing the fire source and recording the burning time as $t_2$. During the above combustion process, place the cotton 12 in. below the sample and observe whether there were any drops. With five samples, repeat the above test method and record $t_1$ and $t_2$. When the test result was that the average $t_1+t_2$ was between 10 and 30 seconds, the five sets of $t_1+t_2$ time should not be greater than 50 seconds, and no drop was observed, thus the sample was rated UL-94 VTM-0. When the test result was that the average $t_1+t_2$ time was between 10 and 30 seconds, and no drop was observed, thus the sample was rated UL-94 VTM-1.

introduction of phosphorus-containing structures could effectively improve thermal stability and flame retardant property.

[Electrical Properties Analysis of the Cured Product]

Table 2 was summarized as the electrical properties evaluation results from Comparative example 1, Comparative example 2, Comparative example 3, Embodiment 8-1, Embodiment 8-2, Embodiment 9-1, Embodiment 9-2, Embodiment 10-1, and Embodiment 10-2.

In this embodiment, the evaluation methods of the electrical property included: (1) measuring the dielectric constant and loss tangent of the cured film at 10 GHz with a Dielectric constant Analysis (brand and model: Rod Schwarz, Taiwan): cutting the film sample into 9 cm×13 cm,

TABLE 2

Thermal properties analysis of the cured product

| Sample Code | $T_g$ (° C.) (DMA)[a] | $T_g$ (° C.) (TMA)[b] | CTE (ppm/° C.)[c] | $T_{d5}$ (° C.)[d] | CY (%)[e] | UL-94 |
|---|---|---|---|---|---|---|
| Comparative example 1 | 235 | 201 | 63 | 457 | 20 | VTM-0 |
| Comparative example 2 | 221 | 189 | 72 | 433 | 16 | VTM-1 |
| Comparative example 3 | 229 | 199 | 76 | 394 | 27 | VTM-1 |
| Embodiment 8-1 | 260 | 228 | 54 | 425 | 35 | VTM-0 |
| Embodiment 8-2 | 250 | 203 | 50 | 448 | 33 | VTM-0 |
| Embodiment 9-1 | 248 | 198 | 77 | 405 | 25 | VTM-0 |
| Embodiment 9-2 | 236 | 192 | 69 | 423 | 24 | VTM-0 |
| Embodiment 10-1 | 260 | 229 | 64 | 431 | 35 | VTM-0 |
| Embodiment 10-2 | 250 | 204 | 75 | 421 | 38 | VTM-0 |

[a] Using DMA to measure at a heating rate of 5° C./min
[b] Using TMA to measure at a heating rate of 5° C./min
[c] Recording the thermal expansion coefficient between 50° C. and 150° C.
[d] 5% thermogravimetric loss temperature was measured by using TGA at a heating rate of 20° C./min
[e] Residual coke weight at 800° C.

[Thermal Properties Analysis of the Cured Product]

The self-crosslinked cured products in Table 2 were the cured products in Comparative example 1, the cured product in Comparative example 3, and the cured products in Embodiment 8-1, Embodiment 8-2, Embodiment 10-1, and Embodiment 10-2. From the results in Table 2, according to the results of the glass transition temperature measured by DMA, the glass transition temperature of the cured products in Embodiment 8-1 and Embodiment 9-1 were higher (260° C., 248° C.), compared to that of the cured products in Comparative example 2 (221° C.) and Comparative example 3 (229° C.). Next, according to the results of the thermal stabilities of the materials by TGA analysis, the 5% thermogravimetric loss temperature and the coke residual percentage of the cured products in Embodiment 8-1 (425° C., 35%) and Embodiment 10-1 (431° C., 35%) were close to or higher, compared to those of the cured products in Comparative example 2 (433° C., 16%) and Comparative example 3 (394° C., 27%). Therefore, it could be concluded that the introduction of phosphinated structure into the (2,6-dimethyl phenyl ether) oligomer in this embodiment could further improve the thermal properties of the cured product to have better thermal stability. In addition, the results of the UL-94 flame-retardant test showed that the self-crosslinked cured products of all phosphinated (2,6-dimethylphenyl ether) oligomers and the their copolymerized cured products with epoxy resin (Embodiment 8-1, Embodiment 8-2, Embodiment 10-1 and Embodiment 10-2) could all reach Grade VTM V-0. On the contrary, the cured products of commercially available products (the cured products of Comparative example 2 and Comparative example 3) were all Grade V-1, which again showed that the which was measured in a constant temperature environment. (2) Using an impedance analyzer (brand and model: Keysight E4991A) to measure the dielectric constant and loss tangent of the sample material: putting a 200-400 μm thick film into the metal resonant cavity, and starting to test after pressing the seamless gap, with the detection frequency of 10 GHz.

TABLE 3

Electrical properties of the cured product

| Sample Code | Dielectric constant (10 GHz) | Loss tangent (10 GHz) |
|---|---|---|
| Comparative example 1 | 2.70 | 0.003 |
| Comparative example 2 | 2.85 | 0.003 |
| Comparative example 3 | 2.69 (1 GHz) | 0.007 (1 GHz) |
| Embodiment 8-1 | 2.68 | 0.004 |
| Embodiment 8-2 | 2.67 | 0.005 |
| Embodiment 9-1 | 2.78 | 0.006 |
| Embodiment 9-2 | 2.72 | 0.009 |
| Embodiment 10-1 | 2.71 | 0.004 |
| Embodiment 10-2 | 2.71 | 0.006 |

From the results in Table 3, it can be seen that in the cured copolymer (the cured product of Comparative example 2), the dielectric constant of the cured product in Embodiment 8-1 was 2.68, compared to that of the cured product in Comparative example 2 was 2.85, showing that they had similar dielectric constants. The loss tangent of the cured product in Embodiment 8-1 was 0.004, compared to that of the cured product in Comparative Example 2 was 0.003, showing that they had similar loss tangent. Therefore, even if the phosphinated structure was introduced into the (2,6- dimethylphenyl ether) oligomer, good dielectric properties could still be maintained. In addition, according to the results of the UL-94 flame-retardant test, it could be seen that the copolymer cured product of the phosphinated (2,6-dimethylphenyl ether) oligomer with epoxy resin of this embodiment (the cured product in Embodiment 8-1) could reach Grade VTM V-0.

From the results in Table 3, in the self-crosslinked cured product (the cured product of Comparative example 3, Embodiment 10-1), the dielectric constant of the cured product in Embodiment 10-1 was 2.71, compared to that of the cured product in Comparative example 2 was 2.69, and that all had similar dielectric constants. The loss tangent of the cured product in Embodiment 10-1 was 0.004 (10 GHz), compared to that of the cured product in Comparative Example 3 was 0.007, showing that they had similar loss tangent. Therefore, even if the phosphinated structure was introduced into the (2,6-dimethylphenyl ether) oligomer, good dielectric properties could still be maintained.

In summary, in the phosphinated (2,6-dimethylphenyl ether) oligomer and the preparation method thereof in this embodiment, the phosphinated (2,6-dimethylphenyl ether) oligomer could be prepared by only 3 steps, so that the preparation method provided in this embodiment could simplify the steps and reduce the production cost. In addition, the phosphinated (2,6-dimethylphenyl ether) oligomers in this embodiment have excellent organic solubility due to their low molecular weight. Moreover, the cured product prepared from the phosphinated (2,6-dimethylphenyl ether) oligomers in this embodiment can have high glass transition temperature, low dielectric properties, better thermal stability and good flame retardant properties.

Although the present invention has been disclosed in the above embodiments, it is not intended to limit the present invention. Anyone with ordinary knowledge in the relevant technical field can make slight changes and modifications without departing from the spirit and scope of the present invention. Therefore, the scope of protection of the present invention shall be subject to those defined by the scope of attached claims.

What is claimed is:

1. A phosphinated (2,6-dimethylphenyl ether) oligomer, having a structure represented by Formula (1):

Formula (1)

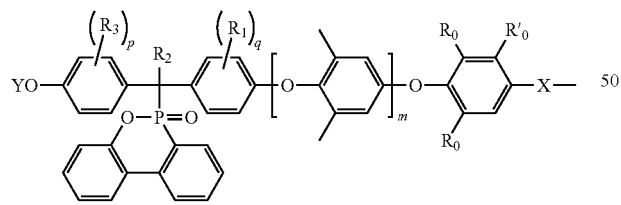

-continued

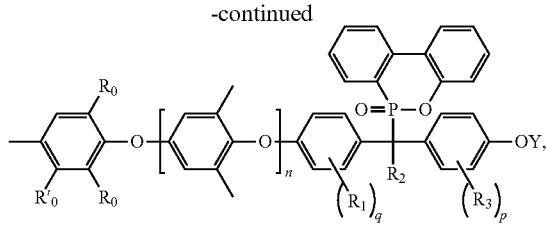

wherein

X is a single bond, $-CH_2-$, $-O-$, $-C(CH_3)_2-$ or

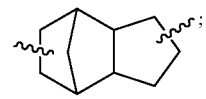

$R'_0$, $R_0$, $R_1$, $R_2$ and $R_3$ are independently hydrogen, C1-C6 alkyl or phenyl, n and m are independently an integer from 1 to 300, p and q are independently an integer from 1 to 4, Y is

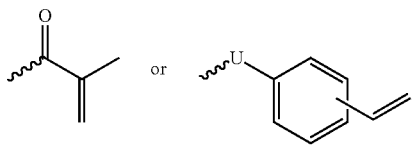

and U is a methylene group.

2. A preparation method for the phosphinated (2,6-dimethylphenyl ether) oligomer having a structure represented by Formula (1) of claim 1, comprising:

reacting a phenolic terminal (2,6-dimethylphenyl ether) oligomer represented by Formula (2) with a phenone compound or a benzaldehyde compound represented by Formula (3) under a catalysis of an alkaline catalyst to obtain a bifunctional (2,6-dimethylphenyl ether) oligomer represented by Formula (4);

reacting the bifunctional (2,6-dimethylphenyl ether) oligomer, 9,10-dihydro-9-oxa-10-phosphaphenanthrene-10-oxide with phenol containing $R_3$ represented by Formula (5) under the catalysis of an acid catalyst to obtain a phosphinated bisphenol (2,6-dimethylphenyl ether) oligomer represented by Formula (6);

reacting the phosphinated bisphenol (2,6-dimethylphenyl ether) oligomer with methyl acrylic anhydride under the catalysis of a nitrogen-containing or alkaline catalyst, or reacting the phosphinated bisphenol (2,6-dimethylphenyl ether) oligomer with 3-vinylbenzyl chloride, 4-vinylbenzyl chloride or a combination thereof under the catalysis of the alkaline catalyst to obtain the phosphinated (2,6-dimethylphenyl ether) oligomer, Formula (2)

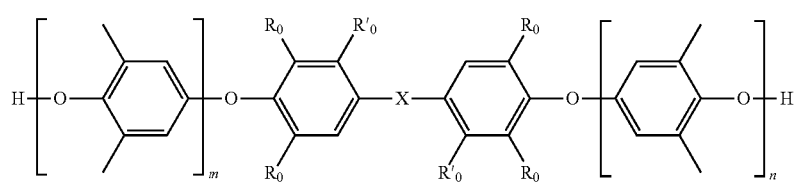

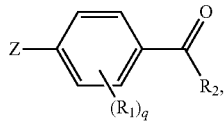

Formula (3)

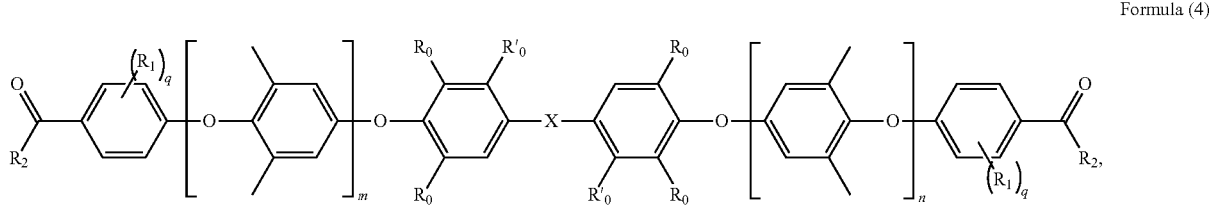

Formula (4)

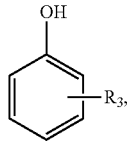

Formula (5)

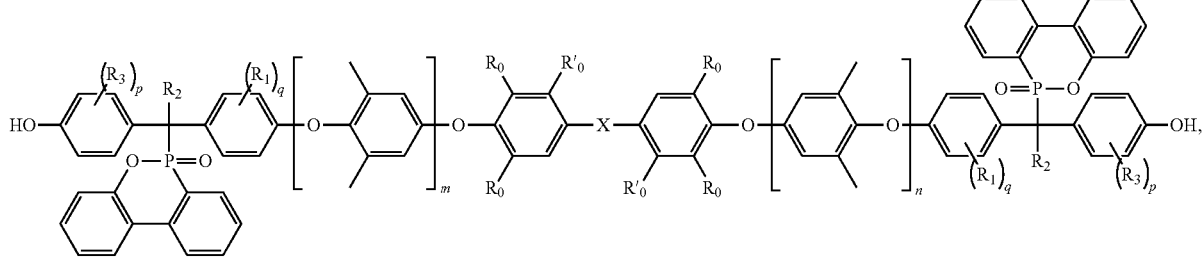

Formula (6)

wherein

X is a single bond, —CH$_2$—, —O—, —C(CH$_3$)$_2$— or

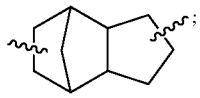;

R'$_0$, R$_0$, R$_1$, R$_2$ or R$_3$ are independently hydrogen, C1-C6 alkyl or phenyl, Z is fluorine or chlorine, n and m are independently an integer from 1 to 300, p and q are independently an integer from 1 to 4.

3. The preparation method for the phosphinated (2,6-dimethylphenyl ether) oligomer according to claim 2, wherein the phenone compound comprises 4-fluoroacetophenone and 4-chloroacetophenone; the benzaldehyde compound comprises 4-fluorobenzaldehyde and 4-chlorobenzaldehyde; the bifunctional (2,6-dimethylphenyl ether) oligomer comprises (2,6-dimethylphenyl ether) oligomer containing a diketone structure or (2,6-dimethylphenyl ether) oligomer containing a dialdehyde structure, wherein the (2,6-dimethylphenyl ether) oligomer containing the diketone structure is a compound when R$_2$ in the Formula (4) is a methyl group, and the (2,6-dimethylphenyl ether) oligomer containing the dialdehyde structure is a compound when R$_2$ in the Formula (4) is hydrogen.

4. The preparation method for the phosphinated (2,6-dimethylphenyl ether) oligomer according to claim 2, wherein the alkaline catalyst comprises potassium carbonate, sodium carbonate, potassium hydroxide, sodium hydroxide, sodium bicarbonate, sodium acetate, or a combination thereof.

5. The preparation method for the phosphinated (2,6-dimethylphenyl ether) oligomer according to claim 2, wherein the acid catalyst comprises hydrochloric acid, hydrobromic acid, hydroiodic acid, sulfuric acid, methanesulfonic acid, methylbenzenesulfonic acid, or a combination thereof.

6. The preparation method for the phosphinated (2,6-dimethylphenyl ether) oligomer according to claim 2, wherein the nitrogen-containing catalyst comprises 4-dimethylaminopyridine, pyridine, imidazole, dimethylimidazole, or a combination thereof.

7. A cured product, which is obtained by curing a mixture of the phosphinated (2,6-dimethylphenyl ether) oligomer as defined in claim 1 and a catalyst by heating.

8. The cured product according to claim 7, wherein the catalyst comprises benzoyl peroxide, tert-butyl cumene peroxide, or a combination thereof.

9. The cured product according to claim 7, wherein the content of the catalyst is 0.1% to 1.0% by weight based on the total weight of the phosphinated (2,6-dimethylphenyl ether) oligomer.

10. A cured product, which is obtained by mixing the phosphinated (2,6-dimethylphenyl ether) oligomer as defined in claim 6 with an epoxy resin, followed by copolymerizing under a catalyst by heating, wherein the catalyst comprises an epoxy resin ring open agent and a double bond initiator.

11. The cured product according to claim 10, wherein the epoxy resin ring open agent comprises 4-dimethylaminopyridine, pyridine, imidazole, dimethylimidazole, or a combination thereof.

12. The cured product according to claim 10, wherein the content of the epoxy resin ring open agent is 0.5% to 2.0% by weight based on the total weight of the epoxy resin.

13. The cured product according to claim 10, wherein the double bond initiator comprises benzoyl peroxide, tert-butyl cumene peroxide, di-tert-butyl peroxide, or a combination thereof.

14. The cured product according to claim 10, wherein the content of the double bond initiator is 0.1% to 1.0% by weight based on the total weight of the phosphinated (2,6-dimethylphenyl ether) oligomer.

15. A method of using the phosphinated (2,6-dimethylphenyl ether) oligomer as defined in claim 1, comprising providing the phosphinated (2,6-dimethylphenyl ether) oligomer as a material for making a base board, a copper clad laminate or a printed circuit board.

* * * * *